United States Patent [19]

Pfeiffer

[11] Patent Number: 5,205,537
[45] Date of Patent: Apr. 27, 1993

[54] VALVE WITH ENHANCED RANGEABILITY AND LOGARITHMIC FLOW CHARACTERISTIC

[76] Inventor: Robert W. Pfeiffer, 3 Hidden Spring La., Rye, N.Y. 10580

[21] Appl. No.: 736,702

[22] Filed: Jul. 26, 1991

Related U.S. Application Data

[63] Continuation-in-part of Ser. No. 639,414, Jan. 10, 1991, abandoned, which is a continuation of Ser. No. 563,932, Aug. 6, 1990, abandoned, which is a continuation of Ser. No. 84,635, Aug. 12, 1987, abandoned, which is a continuation-in-part of Ser. No. 48,078, May 11, 1987, abandoned, which is a continuation-in-part of Ser. No. 570,171, Jan. 12, 1984, Pat. No. 4,664,139.

[51] Int. Cl.$^5$ .......................... F16K 3/26; F16K 3/32
[52] U.S. Cl. .................................. 251/205; 251/326; 251/120; 251/368; 137/375; 137/240
[58] Field of Search ............... 137/240, 375; 251/205, 251/63, 120, 326, 327; 406/192, 195, 183; 222/561, 216, 559

[56] References Cited

U.S. PATENT DOCUMENTS

| | | | |
|---|---|---|---|
| 1,090,807 | 3/1914 | Warthen | 251/63 X |
| 1,550,725 | 8/1925 | Jung | 251/205 X |
| 1,770,717 | 7/1930 | Stremberger | 251/205 X |
| 1,892,260 | 12/1932 | Wick | 251/326 X |
| 3,240,466 | 3/1966 | Meyer | 251/205 |
| 4,331,533 | 5/1982 | Dean et al. | |
| 4,332,674 | 6/1982 | Dean et al. | |
| 4,336,160 | 6/1982 | Dean et al. | |
| 4,471,942 | 9/1984 | Kocanowski | 251/205 |

FOREIGN PATENT DOCUMENTS

1239151 7/1971 United Kingdom .

OTHER PUBLICATIONS

DeZurik Series C Knife Gate Valves, Bulletin 3:00-1, Oct., 1977.
Section 4 Appendix-Technical Data.

*Primary Examiner*—Arnold Rosenthal
*Attorney, Agent, or Firm*—Victor E. Libert

[57] ABSTRACT

A control valve well-suited for controlling the flow of particulate solids comprises a valve body having a flow passageway comprising inlet and outlet passages extending transversely to a slide chamber. A plug member having a flow orifice is mounted for movement, within the slide chamber to seal the flow passageway when the flow orifice is out of registration therewith and to connect the inlet and outlet passages in flow communication when registered therewith. The flow orifice has a cross section including a tapered slot portion which terminates in an apex defining an angle of from about 45 to 90 degrees and a rectangular base portion or a circular arc base portion subtending from 225 to about 270 degrees of arc. This shape provides valves of enhanced rangeability with a unique logarithmic flow characteristic which, for most flow rates, is intermediate to linear and equal percentage flow characteristics.

32 Claims, 14 Drawing Sheets

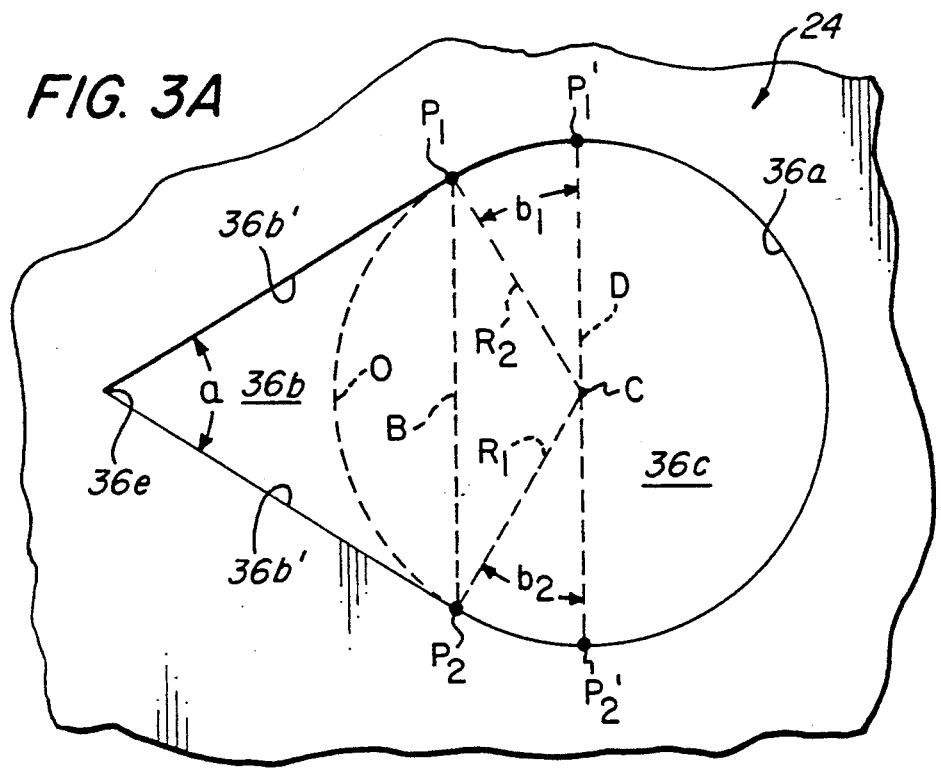
FIG. 3A
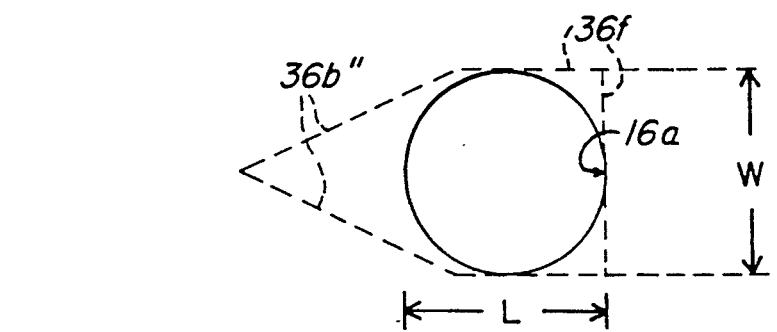
FIG. 3B
FIG. 3C

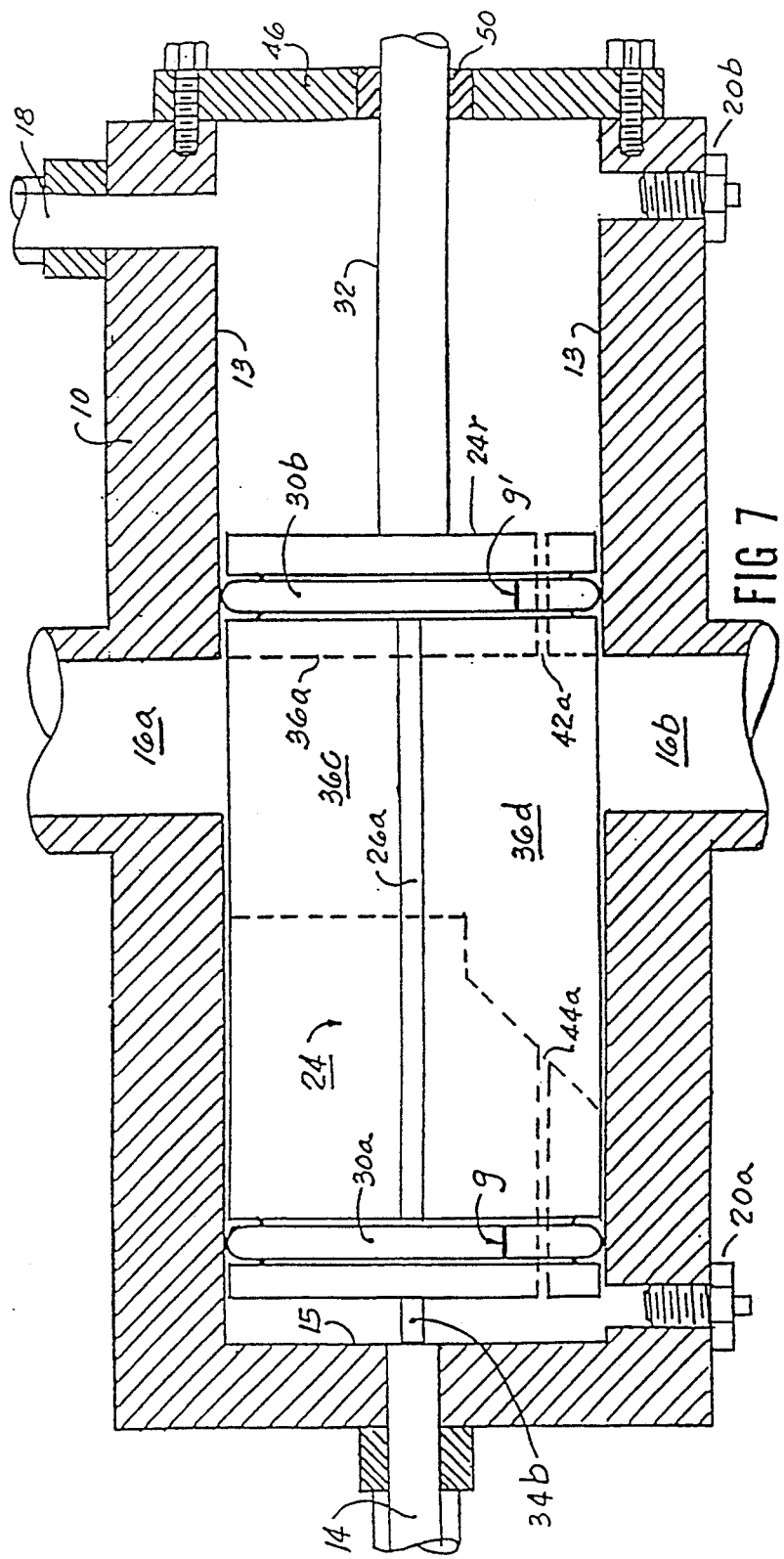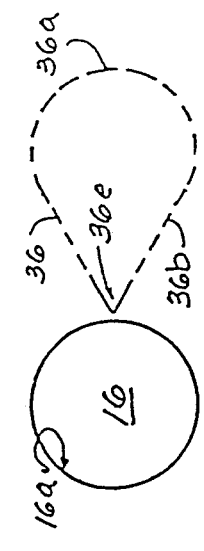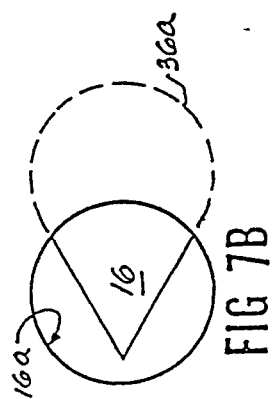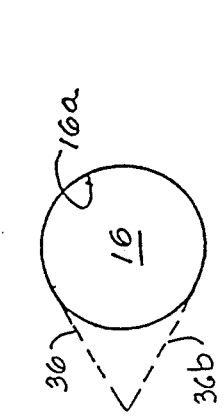

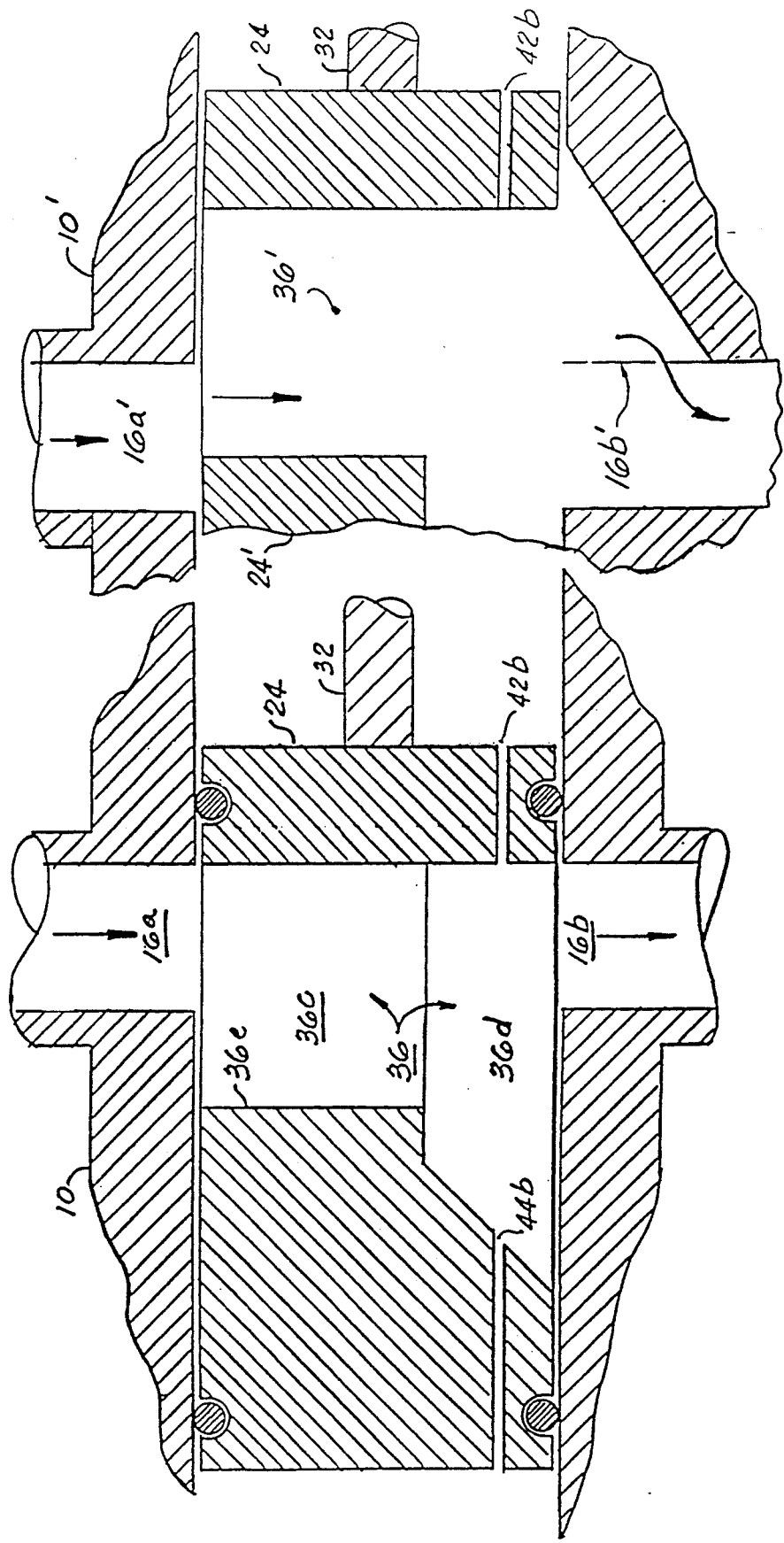

5,205,537

VALVE WITH ENHANCED RANGEABILITY AND LOGARITHMIC FLOW CHARACTERISTIC

REFERENCE TO RELATED APPLICATION

This application is a continuation-in-part of application Ser. No. 07/639,414, now abandoned, filed Jan. 10, 1991 in the name of Robert W. Pfeiffer and entitled "VALVE WITH ENHANCED RANGEABILITY AND LOGARITHMIC FLOW CHARACTERISTIC", which application was a continuation of application Ser. No. 07/563,932 filed Aug. 6, 1990, now abandoned, in the name of Robert W. Pfeiffer and entitled "VALVE WITH ENHANCED RANGEABILITY AND LOGARITHMIC FLOW CHARACTERISTIC", which application was a continuation of application Ser. No. 07/084,635, filed Aug. 12, 1987, now abandoned, in the name of Robert W. Pfeiffer and entitled "VALVE WITH ENHANCED RANGEABILITY AND LOGARITHMIC FLOW CHARACTERISTIC", which application was a continuation in part of application Ser. No. 07/048,078 filed May 11, 1987, now abandoned, in the name of Robert W. Pfeiffer and entitled "VALVE WITH ENHANCED RANGEABILITY AND LOGARITHMIC FLOW CHARACTERISTIC", which in turn is a continuation-in-part of application Ser. No. 06/570,171 filed Jan. 12, 1984 in the name of Robert W. Pfeiffer and entitled "VALVE ESPECIALLY FOR CONTROLLING PARTICULATE SOLIDS FLOW", now U.S. Pat. No. 4,664,139.

BACKGROUND OF THE INVENTION

The present invention pertains to an improved valve and more particularly pertains to a valve having enhanced rangeability and a logarithmic incremental flow characteristic. The valves of the invention are particularly well adapted to the valving of dry solid particulate materials having high flowing densities (for example, fluidized solids such as the fluidized catalysts flowed through dense-phase standpipes utilized in fluid catalytic cracking units), and slurries of coal or other abrasive particulate solids in liquids.

The prior art discloses valve structures specifically designed for handling fluidized solids, other solid particulates and/or slurries, and shows an awareness of the problems of flow characteristics and of wear of the component parts of such valves by the handling of abrasive solid materials.

Bulletin 31.00-1, October 1977, *DeZurik Series C Knife Gate Valves* is a brochure published by DeZurik, a unit of General Signal, Sartell, Minn., 56377. At page 3, paragraph 12, this brochure shows a "vee-orifice valve" for throttling control of thick slurries such as paper stock.

U.S. Pat. No. 1,892,260 (L. D. Wick) shows a pneumatic dash gun for applying a stucco finish, the gun including a storage receptacle for holding the mixture of sand, cement and water which is supplied through a valve into an air pipe for delivery through a nozzle. The valve comprises a plate containing a generally ovoid-shaped opening which is movable into and out of register with a circular cross section conduit leading from the storage receptacle.

German Offenlegungsschrift 1918875 published Nov. 6, 1969 by W. Hausammann et al also appears to disclose in FIG. 1 a valve in which a triangular port 27 is brought into and out of register with a circular orifice 17.

U.S. Pat. No. 1,550,725 (Jung) discloses a valve construction having a triangular port (43 in FIG. 2) which aligns with a triangular shaped opening into a circular cross section orifice 31.

SUMMARY OF THE INVENTION

In accordance with the present invention, there is provided a control valve comprising a valve body having a slide chamber therein and an inlet passage and an outlet passage cooperating to partially define a flow passageway transversely intersecting the slide chamber. A plug member is mounted for movement within the slide chamber and has a flow orifice extending transversely therethrough, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith. Positioning means operatively connected to the plug member positions the plug member at selected locations within the slide chamber to selectively adjust registration of the flow orifice with the inlet and outlet passages, at fully open, fully closed and a plurality of intermediate throttling positions. The flow orifice and flow passageway are respectively dimensioned and configured to provide for a flow which is unconstricted by the flow orifice at the fully open position and to further provide a flow characteristic such that a plot of percentage lift on the ordinate versus percentage flow and/or valve open area as the abscissa on log—log coordinates defines a straight line of positive slope.

One aspect of the invention provides a valve as described above having a flow rangeability of from about 50 to about 67, preferably about 58, e.g., 58.3. Another aspect of the invention provides the valve as discussed above having an area rangeability of from about 43 to about 47.5, e.g., an area rangeability of 46.9.

In another aspect of the invention, the valve has inlet and outlet passages of circular cross section, and the flow orifice is of elongated cross section. At least a segment of the flow orifice has a tapered slot portion with a cross-sectional flow area less than that of the flow passageway and a base portion at least as wide as the flow passageway which when combined with the tapered slot portion results in a cross-sectional flow area at least as great as the cross-sectional flow area of the flow passageway. The base portion may define an arc of a circle of a diameter at least as great as the diameter of the flow passageway, or alternatively, the base portion may have a cross-sectional flow area which defines a rectangle or other polygon having a width at least as great as the diameter of the flow passageway. The tapered slot portion of the flow orifice is for at least a majority of its length narrower than the diameter of the flow passageway whereby, when the base portion is fully registered with the flow passageway, the valve is fully open to flow therethrough and when the tapered slot portion or part thereof is registered with the flow passageway, the valve is partially open for flow therethrough.

Another aspect of the invention provides that the tapered slot portion of the flow orifice has in flow cross section the shape of the legs of an isosceles triangle defining at their apex ends an angle of from about 45 to 90 degrees, for example, about 55 to 65 degrees or preferably 60 to 75 degrees, and for a specific example, about 60 degrees. The base portion may have the shape of an arc of a circle subtending from about 225 to about 270 degrees, for example, about 235 to 245 degrees, or preferably 240 to 255 degrees, and for a specific example, about 240 degrees. The legs of the triangle extend from the apex, respectively, one to each opposite end of the arc. Alternatively, the base portion may define a rectangle or other polygon, one side of which coincides with the base of the isosceles triangle.

In one aspect of the invention, the flow orifice is of constant cross-sectional shape. The inlet and outlet passages may be located at respective radially opposite sides of the slide chamber, i.e., they may be coaxial. In a different aspect of the invention, the flow orifice may comprise an inlet segment facing the inlet passage of the flow passageway, and an outlet segment facing the outlet passage of the flow passageway, and the cross-sectional area of the outlet segment is equal to or greater than the maximum cross-sectional area of the inlet segment whereby, at all operating positions of the plug member within the slide chamber, the outlet passage is unconstricted by the plug member. The flow orifice may have an ovoid cross section and its base portion may be dimensioned and configured to be congruent with an arc of the cross section of the inlet passage.

The slide chamber may have a generally cylindrical bore, and the plug member may have a generally cylindrical configuration.

In some aspects of the invention, the cross-sectional flow area through the flow orifice of the plug is as large or larger than the cross-sectional flow area of the inlet and outlet passages so that at the "fully open" position, the plug member does not reduce flow through the valve.

In another aspect of the invention, the plug member is a plate-like member and the flow orifice extends through the major surfaces thereof. Preferably, at least a portion of the flow cross-sectional area of the base portion of the flow orifice, when of ovoid configuration, is congruent with a section of the inlet passage whereby, when the base portion is fully registered with the inlet passage, the valve is fully open to flow therethrough and, when the slot portion or part thereof is registered with the inlet passage, the valve is partially open for flow therethrough.

Two or more of the above described aspects of the invention may be combined in a single embodiment; other aspects of the invention will become apparent from the following detailed description.

BRIEF DESCRIPTION OF THE DRAWINGS

FIG 3A is a plan view similar to that of FIG. 3, but on an enlarged scale and with the plug member broken away, showing geometric reference points and lines applied to the inlet segment of the flow orifice;

FIG. 3B is a plan view similar to that of FIG. 3 but showing a plug member with a flow orifice having a rectangular base portion;

FIG. 3C is a schematic plan view showing the rectangular base portion of the plug member of FIG. 3B in full registration with the flow passageway;

FIG. 7 is an assembly view in side elevation, with the valve body shown in section view for clarity of illustration, of the valve of FIGS. 1-6 showing the plug in wide-open operating position for solids flow;

FIGS. 7A-7C are schematic plan views showing the relative positions of the flow passageway of the valve body and the ovoidal flow orifice of the plug member during operation of the valve;

FIG 8A is a semi-schematic cross-sectional view in elevation taken along the longitudinal axis of the valve of FIG. 7, with parts omitted;

FIG. 8C is a schematic view of a valve generally corresponding to that of FIG. 8A showing another embodiment of the invention;

DEFINITIONS AND DETAILED DESCRIPTION OF THE EMBODIMENTS OF THE INVENTION

Definitions

Before describing specific embodiments of the invention, it is useful to set forth some definitions of terms conventionally employed in the valve design art and employed herein.

Figure 11:
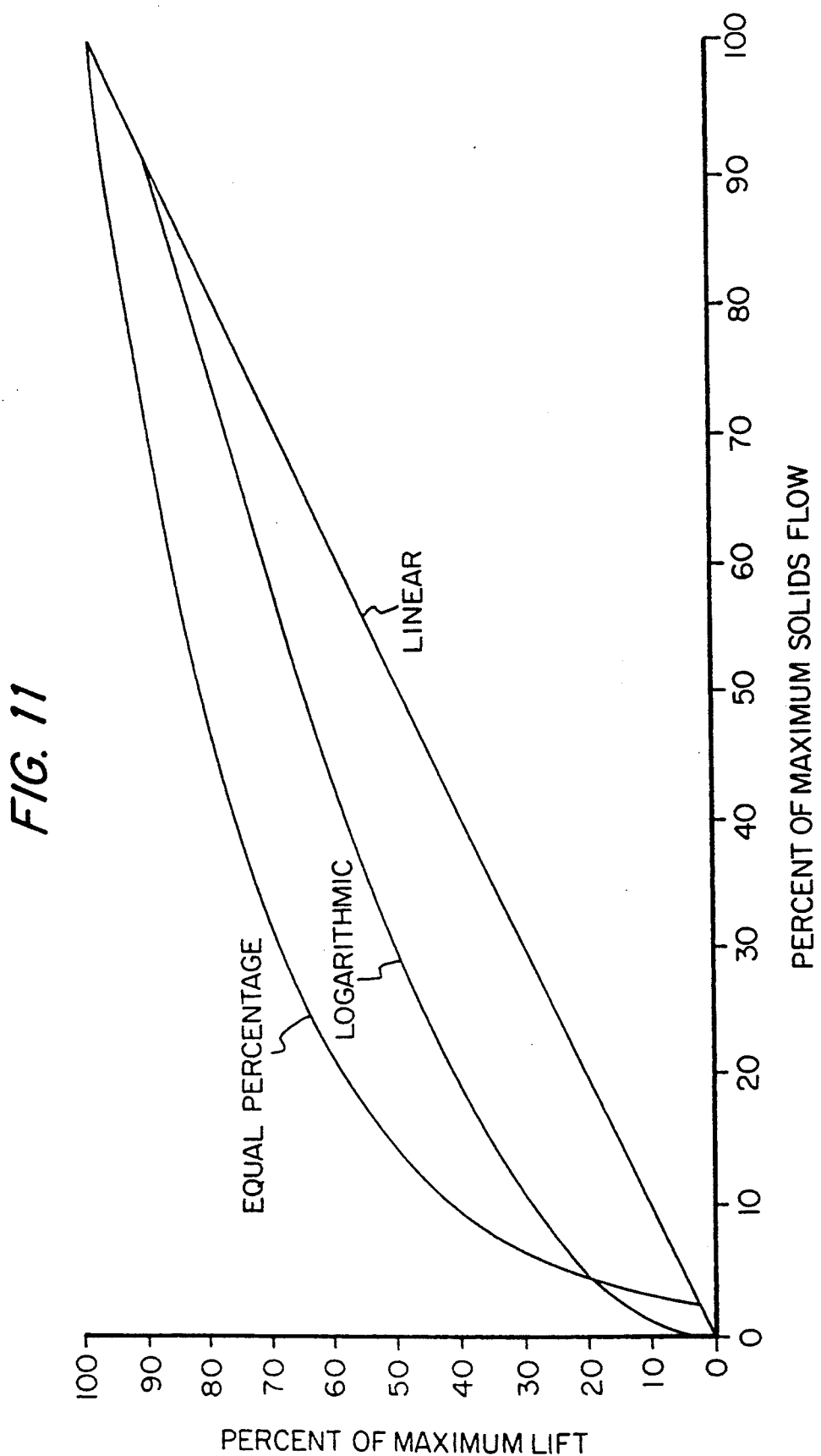
FIG. 11 is a plot of three control valve flow characteristics on Cartesian or arithmetic. i.e., non-logarithmic, scales, with percent of maximum lifts on the ordinate and percent of maximum flow on the abscissa.

As is well known to those skilled in the art, a control valve design must take into account the desired flow characteristic of the valve, which flow characteristic is conventionally characterized as either a "linear" or "equal percentage" flow characteristic. In valves which display a linear flow characteristic, the quantity of flow is directly proportional to the lift or stroke of the valve. The lift or stroke of the valve is the amount of linear movement of the valve plug to adjust the effective size of the flow opening provided by the valve. "MAXIMUM LIFT", as used herein and in the claims, means the full range of lift of the valve. The amount of lift in a given case is expressed as the percentage of maximum lift, e.g., "10% of maximum lift" means an amount of lift equal to 10% of the maximum lift. Reference herein and in the claims to a "percent of lift" or like will, unless otherwise explicitly stated, be understood to mean a percent of maximum lift. The flow characteristic of a valve can be graphically plotted and is conventionally done by plotting the percent of maximum lift on the ordinate versus the flow through the valve on the abscissa, the flow being expressed as the percent of maximum flow through the valve. Reference herein and in the claims to a "percent of flow" or the like will, unless otherwise explicitly stated, be understood to mean a percent of maximum flow. Accordingly, at zero percent of maximum flow the valve is fully closed and at 100% of maximum flow the valve is fully open. For example, a flow characteristic plot for linear flow characteristic valve is shown in FIG. 11, plotted with the lift as the ordinate versus flow as the abscissa on Cartesian, i.e., arithmetic, coordinates and yields a straight line (labelled "LINEAR" in FIG. 11) which is of unitary slope.

In valves which display an equal percentage flow characteristic, the change in quantity of flow per unit change in lift is proportional to the quantity flowing before the unit change in lift is made. As shown in FIG. 11, a plot of the flow characteristic of an equal percentage flow valve results in a curved line (labelled "EQUAL PERCENTAGE" in FIG. 11) which is concave downward.

Figure 12:
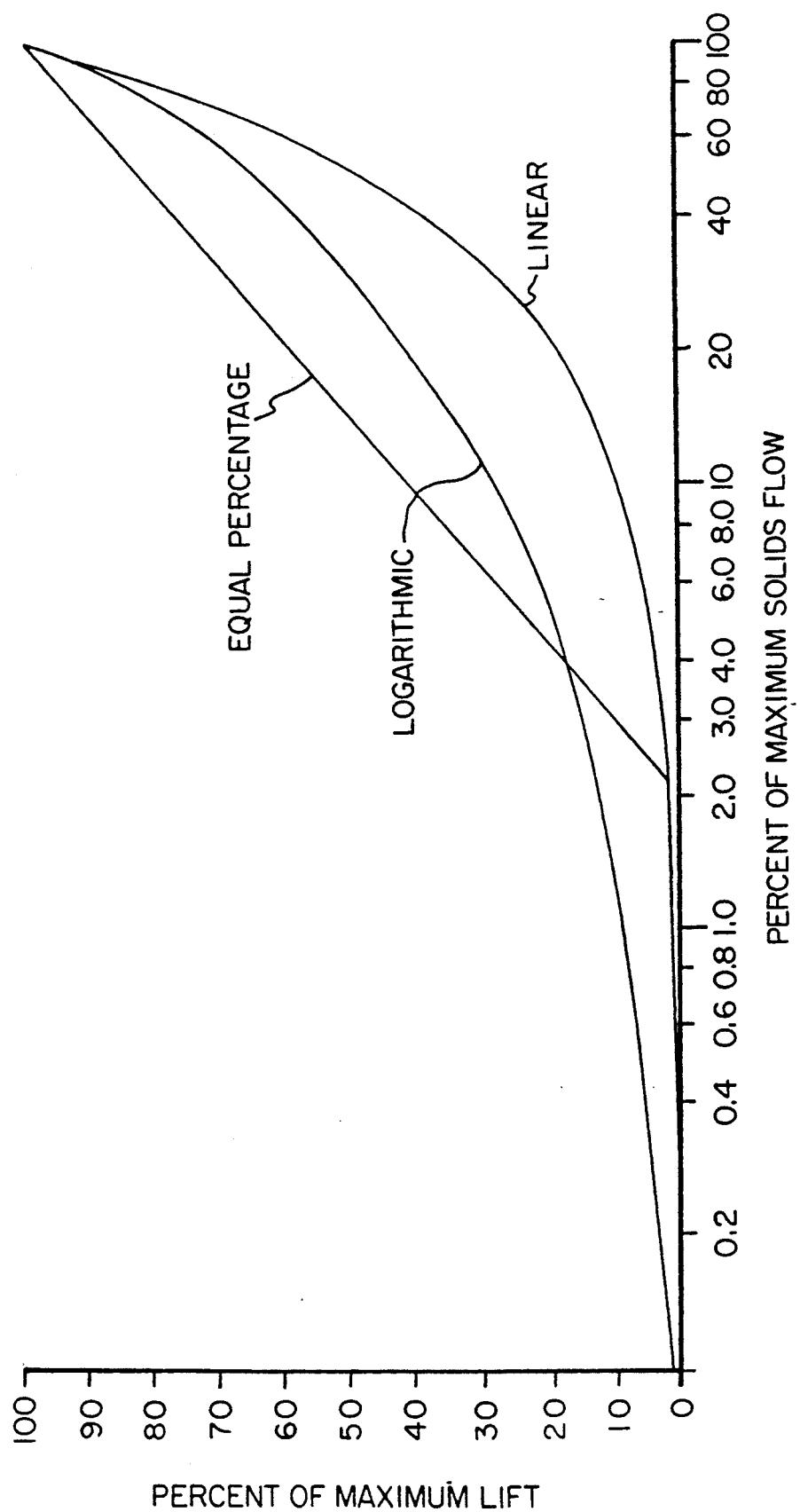
FIG. 12 is a plot of the data of FIG. 11 with an arithmetic ordinate and a logarithmic abscissa, i.e., a semi-log plot of the data of FIG. 11.

FIG. 12 shows a plot of percent of maximum lift on an arithmetic ordinate versus percent of maximum flow on a logarithmic abscissa, i.e., a semi-log plot, and show that on such a semi-log plot the linear flow characteristic is a curved, concave upward line (labelled "LINEAR" in FIG. 12) and the equal percentage flow characteristic results in a straight line (labelled "EQUAL PERCENTAGE" in FIG. 12) of positive slope.

Rangeability, conventionally expressed as a "flow" rangeability, is an inherent property of any given flow control valve and is normally defined as the ratio of maximum controllable flow to the maximum controllable flow of which the valve is capable while maintaining a particular desired flow characteristic. For any given service, a valve is conventionally designed for a planned maximum flow of about 70 percent of the maximum flow attainable in that service which the valve in its full open position. The reason for this is to provide additional capacity in the valve to allow for uncertainties in design, pressure drop and flow parameters and to accommodate increased flow requirements during transient upset conditions. Further, as may be seen in FIG. 11 in the case of a valve of equal percentage flow characteristic, 70 percent of maximum flow correspond to about 90 percent of maximum lift. In normal operation. it is not considered desirable to operate within 10 percent of the minimum or maximum lift ( i.e. in the ranges of 0–10% or 90–100%) because that is too close to the ends of the operating range of the valve. Therefore, as regards valve lift, it is deemed prudent to provide for controlling flow by manipulation of the valve within the range of about 10 percent to about 90 percent of maximum lift. Accordingly, having reference to the above description, as used herein and in the claims, the term "rangeability" is defined as the ratio of percent maximum flow at design capacity (70% of maximum flow) divided by the percent maximum flow existing at 10 percent of maximum lift.

Another valve property, related to rangeability as defined above, is "Area Rangeability," which is defined herein as the ratio of the percent of maximum flow cross-sectional area at designed capacity divided by the percentage of the maximum flow cross-sectional area at ten percent lift. To avoid confusion with "flow" rangeability in the computation of these area rangeability valve characteristics, the flow cross-sectional area at design capacity is taken to the 75% of the maximum flow cross-sectional area available. Thus, like rangeability, area rangeability is a measure of the degree to which the valve can control flow while operating within preferred physical limitations, i.e., while operating between the ten percent lift and the lift corresponding to 75% of the maximum available flow cross-section area. An advantage of using area rangeability instead of "flow" rangeability as a valve characteristic is that values of area rangeability may be directly calculated for any valve. By contrast, when dealing with "flow" rangeability, such comparisons cannot be made without taking into account the coefficients of discharge of the valves being compared, which coefficients may vary with percent valve openings, and which can only be determined by testing the valves. This problem is avoided by using area rangeability, which is independent of the coefficients of discharge.

Still another valve property useful in describing operation of a valve in its "unit sensitivity" which, as used herein and in the claims, is defined as the percentage change of existing flow per one percent change of maximum lift. In the context of this definition, "existing flow" is the flow prior to commencing the one present increment in lift.

A detailed description of linear and equal percentage flow characteristics, rangeability and unit sensitivity is contained in a publication entitled *Masoneilan Control Valves and Auxiliary Equipment*, Catalog No 310, Fourth Edition, 1963, Worthington Corporation, Mason-Neilan Division, Norwood, Massachusetts 02062. The entire content of this publication is incorporated by reference herein.

Embodiments of the Present Invention

Figure 13:
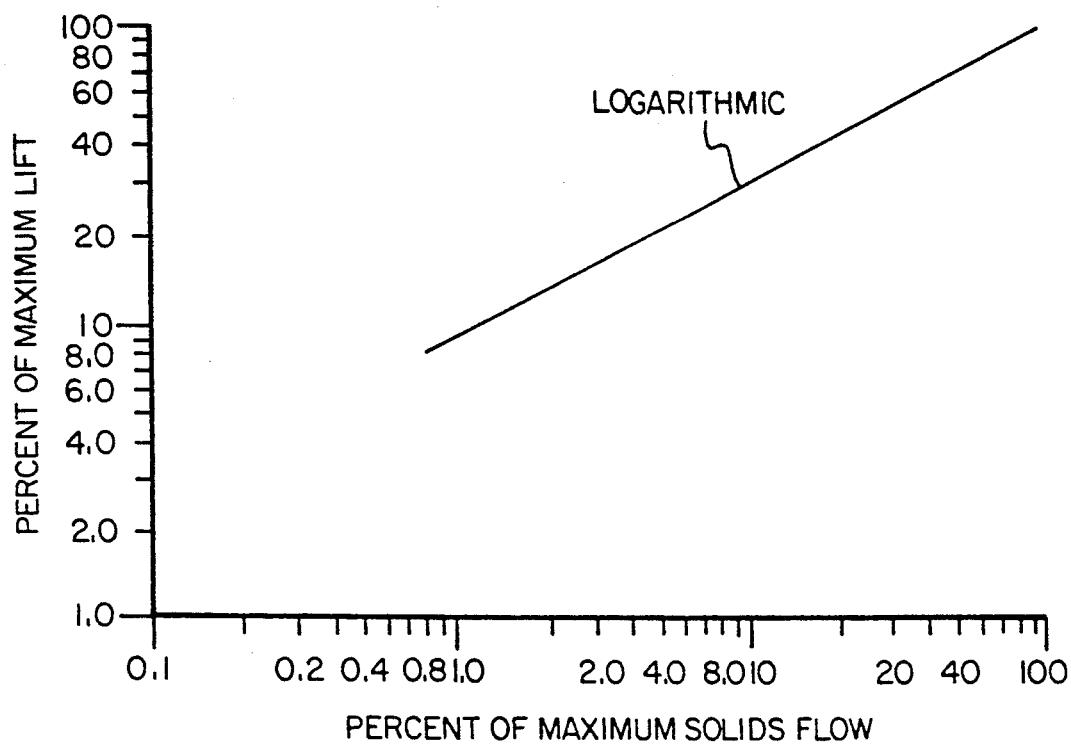
FIG. 13 is a plot of the data of the curve labelled "LOGARITHMIC" in FIGS. 11 and 12, with logarithmic ordinate and abscissa scales, i.e., a log-log plot of the "LOGARITHMIC" curve data of FIGS. 11 and 12.

Valves designed in accordance with the present invention exhibit a unique flow characteristic and enhanced rangeability. Valves in accordance with the present invention display a flow characteristic which is intermediate to the linear and equal percentage flow characteristics for most of the flow range as shown by FIGS. 11 and 12 in which the flow characteristic lines of valves in accordance with the present invention are labelled "LOGARITHMIC" and comprise, in the arithmetic plot of FIG. 11, a concave down curved line and in the semi-log plot of FIG. 12 a concave up curved line. The flow characteristic of valves in accordance with the present invention are referred to as "logarithmic" because, as shown by FIG. 13, when a plot of percent of maximum lift versus percent of maximum flow is made on logarithmic scales for both ordinate and abscissa, i.e., on log-log scales, a straight line, labelled "LOGARITHMIC" in FIG. 13, results. In FIG. 13, as in FIGS. 11 and 12, the percent of maximum lift is on the ordinate and the percent of maximum flow is on the abscissa.

A specific embodiment of a valve in accordance with the present invention, i.e., a valve displaying a "logarithmic" flow characteristic, is shown in FIGS. 1-7.

Figure 1:
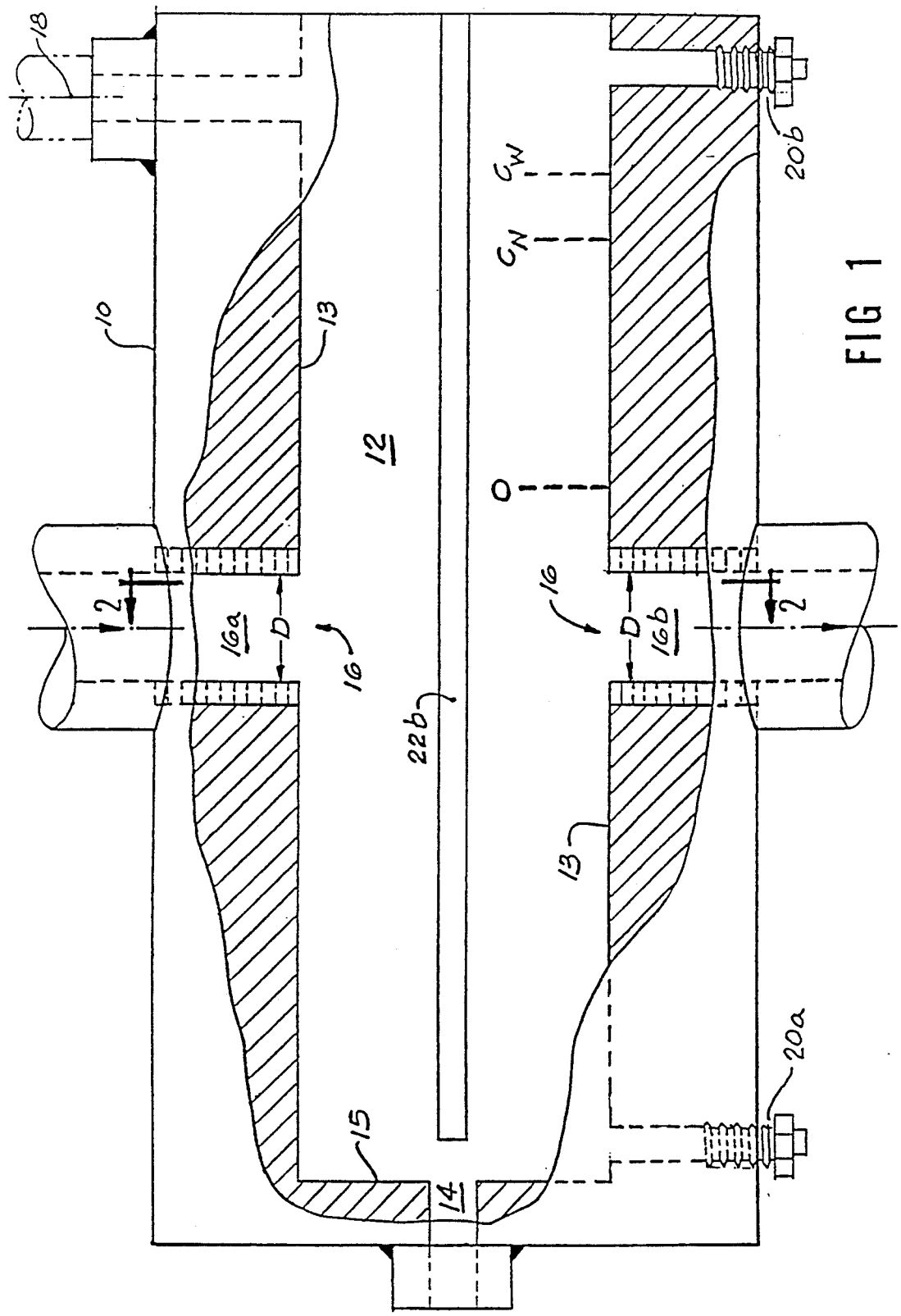
FIG 1 is a side elevational view of the valve body of one embodiment of the present invention, with portions broken away for clarity of illustration.
Figure 5:
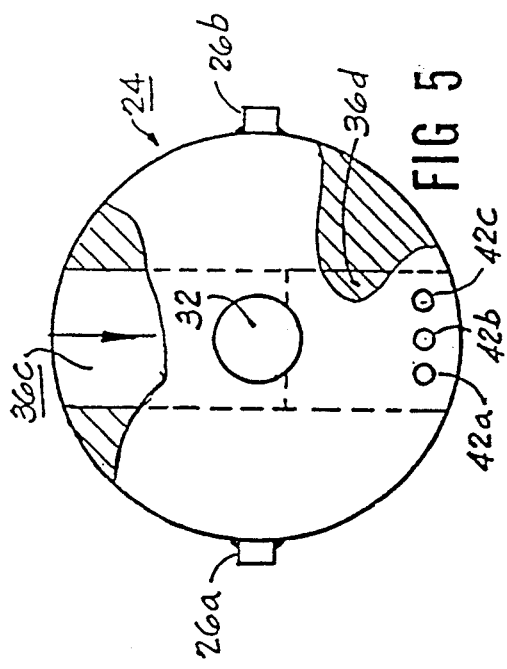
FIG. 5 is an end view along line 5—5 of FIG. 3.
Figure 6:
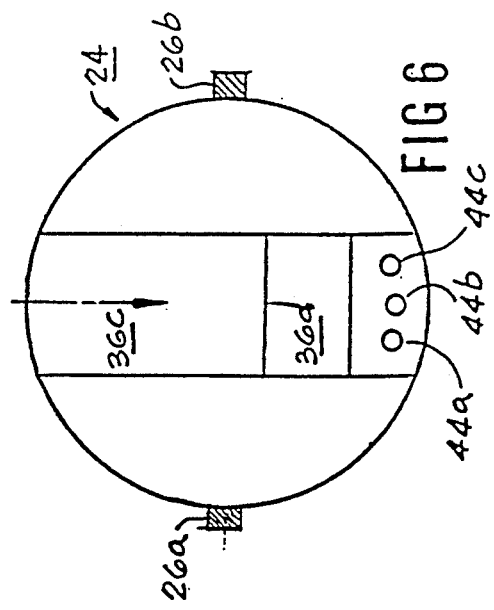
FIG. 6 is a section view along lines 6—6 of FIG. 4.

Referring to FIG. 1, there is shown a valve body 10 having a slide chamber 12 comprising a substantially cylindrical bore defined in part by interior wall 13 and an end wall 15. In other embodiments, slide chamber 12 may have any suitable cross-sectional shape, e.g., square, rectangular, oval, triangular, etc., with a correspondingly shaped plug member mounted therein. Obviously, the outside of the valve body may be of any suitable cross-sectional configuration, independent of the cross-sectional configuration of the slide chamber. Each end of valve body 10 has respective purge gas inlets 14, 18 positioned in flow communication with slide chamber 12. The right hand end (as viewed in FIG. 1) of slide chamber 12 is open to receive therein a slidable plug member, as described below, after which the open end of valve body 10 is sealed by any suitable shaft sealing means (FIG. 7) not shown in FIG. 1.

A flow passageway extending radially through valve body 10 is generally indicated at 16 and is provided in part by inlet passageway 16a and outlet passageway 16b, which extend transversely through valve body 10 and intersect slide chamber 12. In the illustrated embodiment of FIG. 1, a pair of blow down connections 20a, 20b are provided. These are used to sweep particulates from the purge gas chambers with a fluid as may be needed in the event of loss of purge gas supply during operation.

Figure 2:
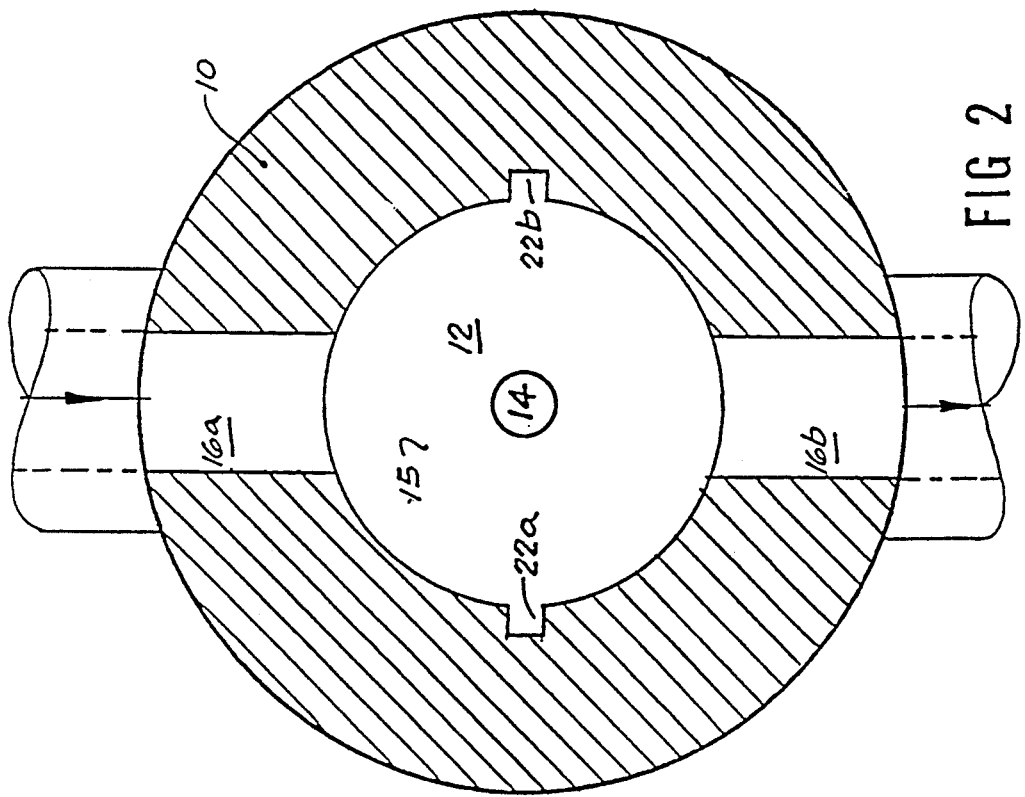
FIG. 2 is a sectional view taken along the line 2—2 of FIG. 1.

As best shown in FIG. 2, substantially cylindrical slide chamber 12 is intersected by inlet and outlet passageways 16a, 16b and has formed along its axial length an opposed pair of grooves 22a and 22b. Only groove 22b is visible in FIG. 1.

Figure 3:
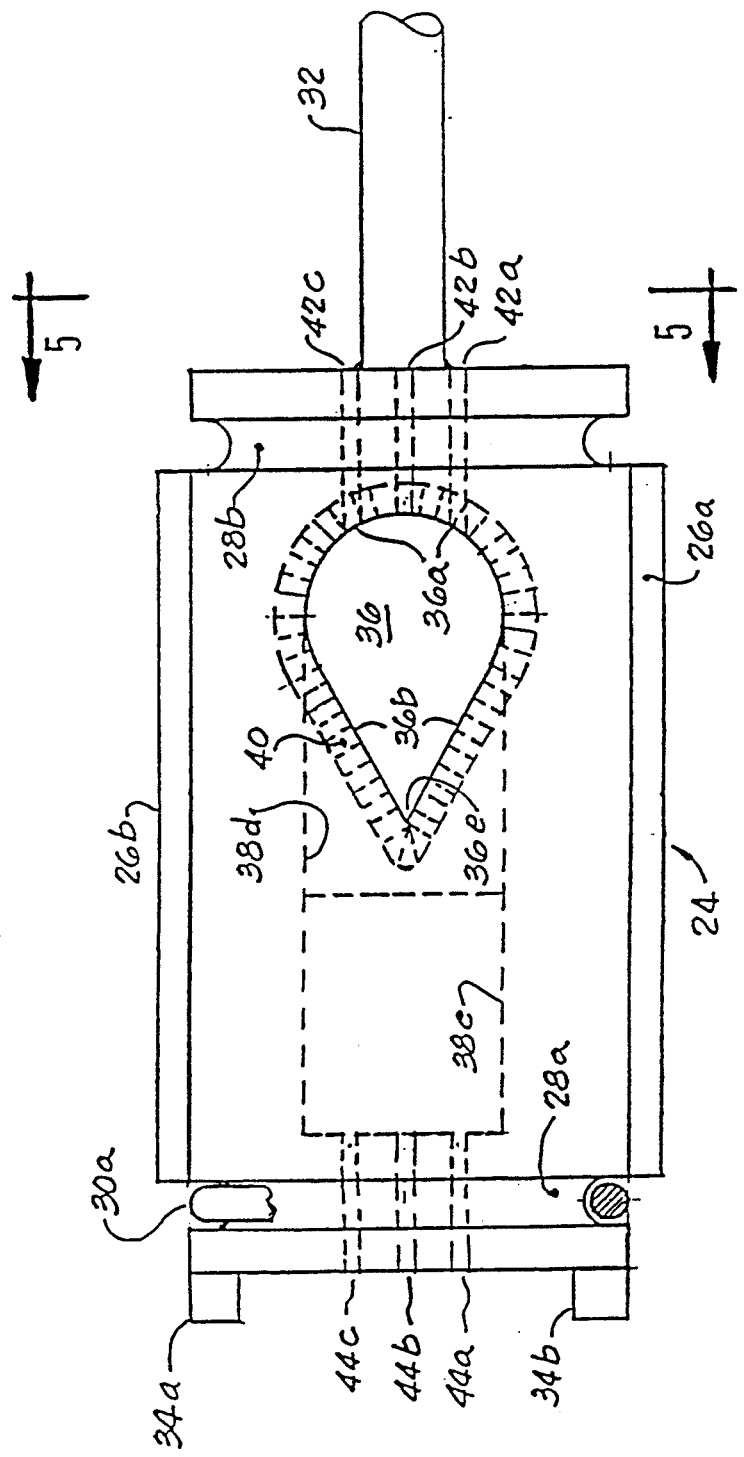
FIG 3 is a plan view of a plug member having a an ovoidal flow orifice therein adapted to be slidably mounted within the valve body of FIG 1.
Figure 4:
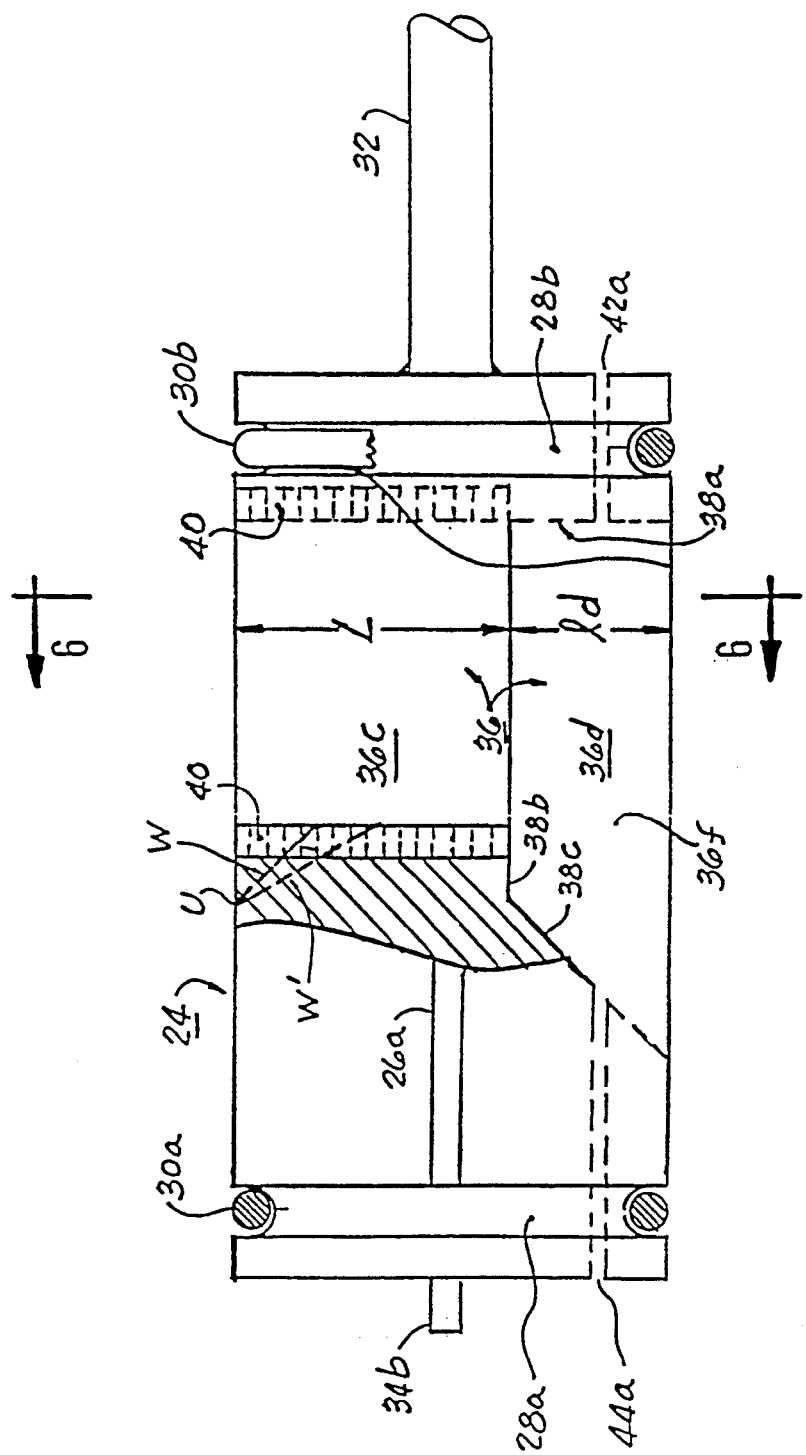
FIG. 4 is a side elevational view of the plug member of FIG. 3 with parts broken away for clarity of illustration.

Referring now to FIGS. 3 and 4, plug member 24 is of generally cylindrical configuration and has a pair of guide rails 26a, 26b formed on radially opposite sides thereof. Guide rails 26a, 26b, which may be of any suitable configuration, are generally rectangular in cross section and are configured and dimensioned to be slidably received within, respectively, grooves 22a and 22b to mount plug member 24 for slidable movement within valve body 10. Circular, circumferential grooves 28a and 28b are formed adjacent opposite respective ends of plug member 24 and contain therein, respectively, annular seal rings 30a, 30b. These seal rings may be made of any suitable material, for example, of the same grade of steel as the valve body and plug, and are radially cut to form a gap therein in the same manner as piston rings. This permits the seal rings to be opened for emplacement over grooves 22a, 22b and then compressed to reduce the gap and fit the seal rings within slide chamber 12 in a manner analagous to that in which piston rings are mounted on a piston head within a cylinder. The nearly-closed gaps are shown at g and g' in FIG. 7. For improved clarity of illustration, annular seal ring 30b is omitted from FIG. 3 and rings 30a and 30b are shown partially broken away and/or in cross section in FIG. 4. Annular seal rings 30a, 30b are preferably made of any suitable heat-resistant, spring-like metal and are dimensioned and configured with a radial gap formed therein so that, upon closure, they bear against the interior wall 13 of slide chamber 12 in sliding, sealing engagement therewith, in the manner of a piston ring bearing against a cylinder wall.

The right hand end, as viewed in FIGs. 3 and 4, of plug member 24 has affixed thereto positioning means comprising a shaft 32 which may be connected to any suitable device, such as a manually or motor driven wheel or other device, for example, a piston operator, adapted to move plug member 24 within slide chamber 12 of valve body so as to position it as desired, as described below. The opposite or left hand end of plug member 24, as viewed in FIGS. 3 and 4, has affixed thereto a pair of stops 34a, 34b (only 34b being visible in FIG. 4). The outer ends of stops 34a, 34b are adapted to contact end wall 15 to set a limit to the leftward (as viewed in FIG. 1) travel distance of plug member 24.

Plug member 24 has a flow orifice 36 extending radially therethrough. As best seen in FIG. 4, flow orifice 36 comprises an inlet segment 36c, which is of ovoid cross section as best seen in FIGS. 3 and 3A, and an outlet segment 36d of expanded cross section. The "cross section" referred to herein is the flow cross section, i.e. ., the cross section shape through which the solids flow. As viewed in FIGS. 3 and 3A, inlet segment 36c of flow orifice 36 is roughly teardrop or egg-shaped in cross-section having a circular-arc base portion 36a, and a tapered slot portion 36b which terminates in an apex 36e. Inlet segment 36c of flow orifice 36 is lined with a hard facing material 40, such as Stellilte or any other suitable highly wear-resistant material. The cross-sectional or flow-constricting shape of inlet segment 36c of flow orifice 36 is shown approximately in scale in FIG. 3A, in which base portion 36a and tapered slot portion 36b are shown in solid line rendition with imaginary geometric lines shown in dash line rendition. Base portion 36a is seen to coincide with or comprise an arc of about 240 degrees of a circle O whose center is at C. Paired, opposite sides of tapered slot portion 36b may be considered to coincide with or comprise legs 36b' of an isosceles triangle whose base is given by imaginary line B. Legs or sides 36b' are substantially tangential to circle O at, respectively, points $P_1$ and $P_2$ where the base B meets legs 36b'. In other words, legs 36b are substantially tangential to the arc of base portion 36a, at the opposite ends of the arc. Points $P_1$ and $P_2$ are located at points on circle O which are displaced 30 degrees of arc towards the tapered slot portion from the points of intersection $P_1'$, $P_2'$ of a diameter D of circle O taken parallel to base B. Angles $b_1$ and $b_2$ are subtended by a radius of diameter D and, respectively, radii $R_1$ and $R_2$ of circle O, and are each about 30 degrees. Angle a, defined by legs 36b', is about 60 degrees. Inlet passageway 16a (FIGS. 1 and 7) is circular in cross section and has a diameter which is substantially equal to that of circle O. A valve with a flow passage of this configuration will provide enhanced rangeability (as described in detail below) and the logarithmic flow characteristics plotted in FIGS. 11, 12, 13 and 14.

Obviously, some departure may be made from the specific geometric relationships shown in FIG. 3A and described above and still obtain valves having enhanced rangeability and a flow characteristic close to the logarithmic characteristics of FIGS. 11, 12, 13 and 14. Thus, angle a may be at least about 45 to about 90 degrees, for example, from about 55 to about 65 degrees, preferably from about 60 to 75 degrees and in a specific example, 60 degrees. Similarly, the angles $b_1$ and $b_2$ are from about 22.5 to 45 degrees, for example, from about 27.5 to about 32.5 degrees, preferably from about 30 to 37.5 degrees, or in the specific example, 30 degrees or, stated otherwise, the arc of circle O subtended by base portion 36a may be from about 225 to 270 degrees, for example, from about 235 to 245 degrees, preferably from about 240 to 255 degrees, and in the specific example, 240 degrees.

In an alternative embodiment of the present invention, the flow cross section of the inlet segment of the flow orifice discussed above may have a rectangular base portion instead of a circular arc. Therefore, as shown in FIG. 3B, plug 24''' is equipped with an inlet orifice segment 36c' having a tapered slot portion determined by edges 36b''' and a rectangular base portion defined by three sides 36f. The base of the imaginary isosceles triangle coincides with the open fourth side of the rectangle. Plug 24''' is otherwise similar to plug 24 shown in FIG. 3A, so structures of plug 24''' corresponding to those of plug 24 (FIG. 3A) have been left unnumbered in FIG. 3B, for simplicity. Preferably, the width W of the rectangular base portion of slot 36c', which is measured at right angles to the direction of travel of plug 24''', is at least equal to the diameter of the circular inlet passage. The length L of the base portion is dimensioned so that the flow cross section of inlet orifice 36c40 is greater than that of inlet passageway 16a (FIG. 1), and so that orifice 36c' allows substantially unobstructed flow when the base portion is fully registered with passageway 16a, as shown in FIG. 3C. In alternative embodiments, base portion 36c' may be configured as a polygon other than a rectangle, with one side coinciding with the base of the isosceles triangle as discussed above.

When plug member 24 is mounted within valve body 10, inlet segment 36c faces inlet passageway 16a, and outlet segment 36d faces outlet passageway 16b. Outlet segment 36d is an expanded opening of stepped configuration defined by its interior walls 38a-38e inclusively, to provide a substantially trapezoidal-shaped, expanded cross section outlet segment 36d. In the embodiment of FIGS. 3-6, inlet segment 36c of flow orifice 36 has a length (indicated by dimension line L) which is somewhat in excess of one-half of the diameter of plug member 24. However, the length L may be of any suitable dimension which will provide adequate wear-resistance as described in more detail below.

As best shown in FIGS. 3-6, one or more fluidizing gas inlet passages 42a, 42b, and 42c are formed in plug member 24 and extend from one end (the right hand end as viewed in FIGS. 3 and 4) of plug member 24 to outlet segment 36d of flow orifice 36. Another similar set of fluidizing gas inlet passages 44a, 44b, and 44c are formed in the opposite end (left hand end as viewed in FIG. 3) and extend therefrom to outlet segment 36d of flow orifice 36.

FIG. 7 shows plug member 24 mounted for sliding movement within valve body 10, guide rails 26a, 26b being received for sliding movement within, respectively, grooves 22a, 22b. The right hand end (as viewed in FIG. 7) of valve body 10 is closed by an end seal 46 which is attached to valve body 10 by any suitable means, e.g., by a series of bolts 48, and which has a central passage therein (unnumbered) for passage of shaft 32 therethrough. Shaft sealing means 50 provides for a sliding gas-tight seal for shaft 32.

In operation, with plug member 24 slidably mounted within valve body 10 and the right hand end of slide chamber 12 closed by end seal 46, positioning means 32 are moved to position plug member 24 at any selected position along its travel path within valve body 10. In order to fully open the valve, plug member 24 is positioned so that base portion 36a of flow orifice 36 is aligned congruently with inlet passageway 16a of flow passageway 16 whereby plug member 24 does not constrict or impede the flow through passageway 36 and the valve is in its fully open position. FIGS. 7A-7C illustrate the relative positions, as would be sensed in a top plan view of the valve assembly of FIG. 7, of plug member 24 and inlet segment 36c of flow orifice 36 thereof to flow passageway 16 (as viewed from inlet passageway 16a, the operation of inlet segment 36c which are shielded from view by valve body 10 are illustrated by dashed line FIGS. 7A-7C). FIGS. 7A and 7C and 8A show the fully registered position of flow orifice 36 with inlet passage 16a which provides full-open flow through the valve. The elements of FIG. 8A are numbered to correspond to those of FIGS. 1-7 and so additional description of them is not necessary. In the preferred embodiment illustrated and as best shown in FIGS. 7A and 8A, the inside diameter of inlet passageway 16a is equal to the inside diameter of the circular-arc forming base portion 36a of inlet segment 36c of flow orifice 36.

The flow characteristic curves of FIGS. 11, 12 and 13 are described by the following mathematical relationships. For the linear flow characteristic curve the equation is:

$$y = ax + b$$

wherein the constant a is unity and the constant b is zero. For a valve having a particular flow characteristic, the unit sensitivity at a given flow is the reciprocal of the derivative of the equation describing its flow characteristic curve, divided by the given flow. Mathematically, this may be expressed as $$US = \frac{100(dx/dy)}{x}$$

wherein US stands for unit sensitivity in this and in the equations below.

In the case of the linear flow characteristic curve, this relationship yields the equation $$US = 100/x.$$

For the logarithmic flow characteristic of valves in accordance with the present invention the flow characteristic equation is $$y = ax^b$$

wherein the constant $a = 9.12039$ and the constant $b = 0.50239$. The unit sensitivity of a logarithmic flow characteristic valve is given by the equation $$US = (100/ba)x^{-b}.$$

For equal percentage flow characteristic valves the flow characteristic equation is $$x = ae^{by}$$

wherein $a = 2.03197$ and $b = 0.03896$. The unit sensitivity of an equal percentage flow characteristic valve is given by the equation $US = 100b$.

The equations given above may be used to define valve operation for valves of the three described types of flow characteristics; calculated valves are given in Table 1.

TABLE 1

| % of Max. Lift | % of Max. Flow | Unit Sensitivity |
|---|---|---|
| A. Equal Percentage Flow Characteristic | | |
| 10.0 | 3.0 | 3.9 |
| 30.0 | 6.5 | 3.9 |
| 50.0 | 14.3 | 3.9 |
| 70.0 | 31.1 | 3.9 |
| 90.9 | 70.0 | 3.9 |
| B. Logarithmic Flow Characteristic | | |
| 10.0 | 1.2 | 19.9 |
| 30.0 | 10.8 | 6.6 |
| 50.0 | 30.0 | 4.0 |
| 70.0 | 59.0 | 2.8 |
| 77.1 | 70.0 | 2.6 |
| C. Linear Flow Characteristic | | |
| 10.0 | 10.0 | 10.0 |
| 30.0 | 30.0 | 3.3 |
| 50.0 | 50.0 | 2.0 |
| 70.0 | 70.0 | 1.4 |

Rangeability as previously defined is obtained by dividing 70% of maximum flow, i.e., the design capacity flow, by the percent of maximum flow corresponding to 10% of maximum lift. By so doing, the rangeability of valves having one of the flow characteristics set forth in Table 1 is calculated as shown in Table 2.

TABLE 2

| Flow Characteristic | Calculation | Rangeability |
|---|---|---|
| A. Equal Percentage | $\frac{70.0}{3.0}$ | 23.3 |
| B. Logarithmic | $\frac{70.0}{1.2}$ | 58.3 |
| C. Linear | $\frac{70.0}{10.0}$ | 7.0 |

As shown by the calculations of Table 2, logarithmic flow characteristic valves in accordance with the present invention exhibit a rangeability about two and one-half times greater than that of equal percentage flow characteristic valves and more than eight times greater than that of linear flow characteristic valves. Rangeability of valves designed in accordance with the present invention may vary from about 50 to about 67. The large rangeability of valves in accordance with the present invention provides a great advantage over conventional valves of either linear or equal percentage flow characteristics. For example, in a fluid catalytic cracking unit which is designed for alternate operation on high-metals content reduced crudes and low-metals content clean gas oil, the fresh catalyst make-up system must operate over an enormous range of continuous addition rates of fresh make-up catalyst to the unit. Utilization of a control or throttling valve in accordance with the present invention provides a valve of greatly enhanced rangeability as compared to conventional valves and therefore one which is capable of maintaining its desired flow characteristic over a much broader range of flow rates.

Figure 8D:
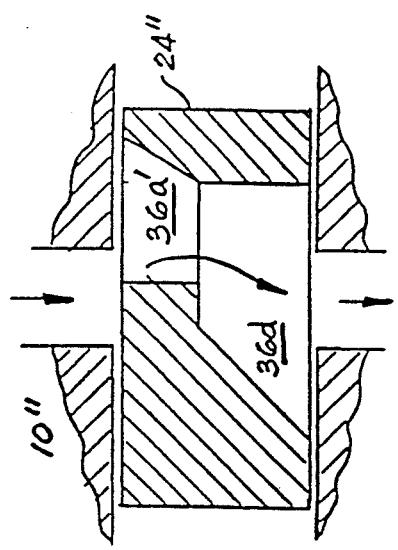
FIG. 8D is a view similar to that of FIG. 8C but on a reduced scale showing yet another embodiment of the invention.
Figure 8B:
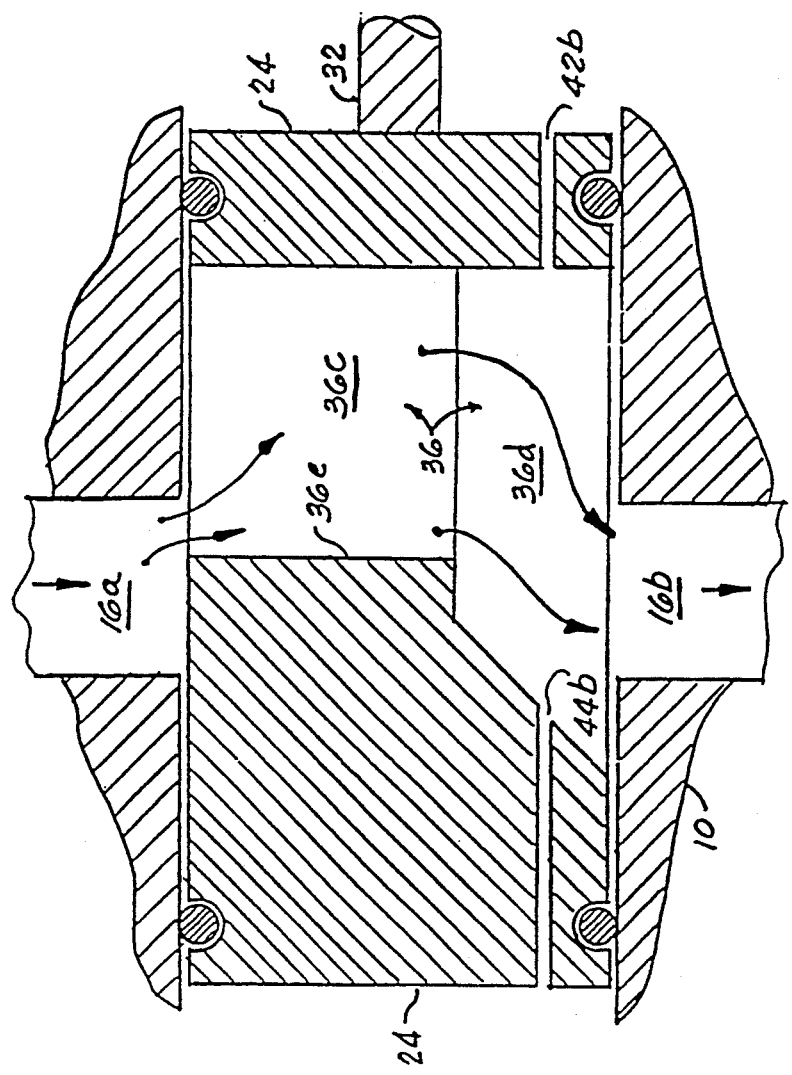
FIG. 8B is a view corresponding to that of FIG. 8A but showing the plug member in a different position within the plug chamber.

When it is desired to reduce the flow through the valve, valve plug 24 is moved a selected distance rightwardly as sensed in FIGS. 1, 3 and 7, so as to move base portion 36a of orifice 36 partially out of registration with inlet passageway 16a, whereby a part or all of tapered slot portion 36b of inlet segment 36c of flow orifice 36 is registered with inlet passageway 16a, and thereby constricts the available opening for flow of material through inlet passageway 16a. The relative positions of flow passageway 16 and inlet segment 36c of orifice 36, when the valve is in a throttling position, are illustrated in FIGS. 7B and 8B. This places the valve in partially open or reduced flow position.

As best shown in FIGS. 7 and 8B, the configuration of outlet segment 36d of flow orifice 36 is seen to be dimensioned and configured to provide a cross-sectional flow area from outlet segment 36d into outlet passage 16b which at all positions from full open to closed, is as large as, or larger than, the cross-sectional flow area of inlet segment 36c. Generally, outlet segment 36d of flow orifice 36 extends leftwardly (as viewed in FIGS. 7 and 8B) beyond inlet segment 36c, so that, at any position of plug member 24, the flow of solids or other material into outlet 16b is not impeded, as described in more detail below. In the embodiment illustrated in FIG. 8A (and in FIGS. 3, 4, 5, and 6) this feature is obtained by expanding outlet segment 36d leftwardly (as viewed in FIGS. 4 and 8A) to maintain a suitable cross-sectional flow are at all operating positions of plug member 24 within valve body 10. The same effect of avoiding a choke point or bottleneck within flow orifice 36 can be attained with a flow orifice which does not have an outlet segment of expanded cross section, e.g., a flow orifice of constant cross section, by utilization of a properly dimensioned and configured outlet passage 16b', as illustrated in FIG. 8C. In FIG. 8C, a valve body 10' has an inlet passage 16a' and an outlet passage 16b', and has a plug member 24' slidably mounted therein. Plug member 24' has a flow orifice 36' of constant cross-sectional area and of any suitable cross-sectional configuration, e.g., ovoid, circular, or the like. Outlet passage 16b' is dimensioned and configured to be expanded rightwardly as viewed in FIG. 8C so that, with the plug member 24' in any operating position, the cross-sectional area for flow from flow orifice 36' into outlet passage 16b' is at least as great as that through flow orifice 36'. Note that if the configuration of flow orifice 36' were used in conjunction with a nonexpanded outlet passage, the configuration of which is indicated by the dotted lines in FIG. 8C, the flow path through flow orifice 36' would be "bottlenecked" at the outlet from flow orifice 36' into outlet passage 16b' which could result in the solid particulates clogging flow orifice 36' and plugging the valve.

As plug member 24 is moved further rightwardly relative to valve body 10 (as viewed in FIGS. 1-3, 8A and 8B) the narrower segment of tapered slot 36b of orifice 36 advances across inlet passage 16a, further constricting flow. When apex 36e of tapered slot 36b contacts or clears the right hand (as viewed in FIGS. 1-3, 8A and 8B) portion of inlet passage 16a, the valve is in its fully closed position. The relative positions of inlet passage 16a and inlet segment 36c of orifice 36, when the valve is in its fully closed position, are illustrated in FIG. 7C. It will be appreciated that plug member 24 may be placed in any selected intermediate position thus providing extremely small increments of position between (and including) the full-open position illustrated in FIGS. 7A and 8A and the fully closed or shut-off position illustrated in FIG. 7C. By dimensioning the flow orifice as described in detail with respect to FIG. 3A or 3B, enhanced rangeability and the unique logarithmic flow characteristic of valves in accordance with the present invention are obtained. The cross-sectional area of the flow passageway adjacent to the ovoid-shaped flow orifice is preferably sized to be circular and of the same diameter as the circular-arc base portion of the ovoid-shaped orifice.

Figure 14:
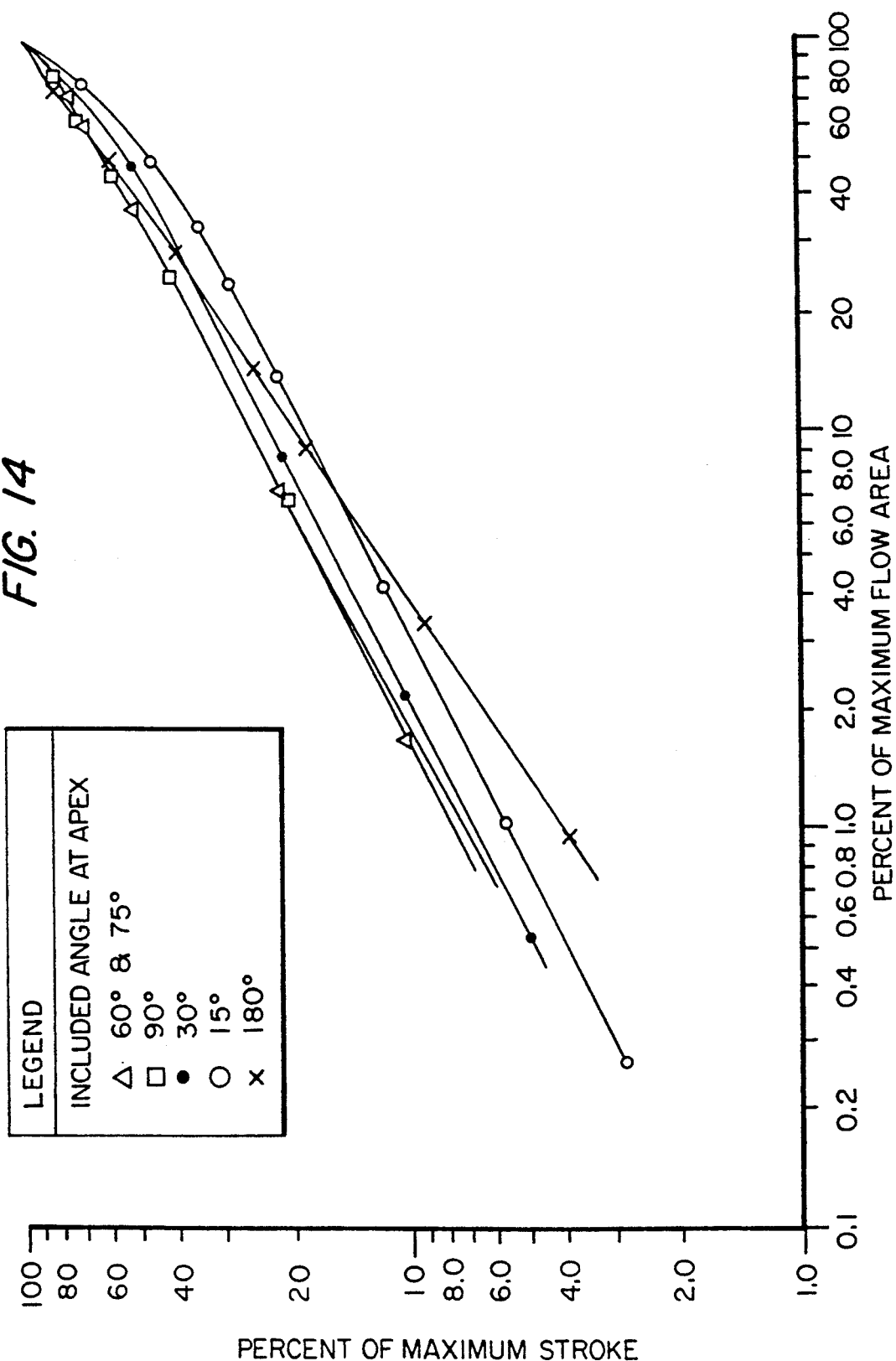
FIG. 14 is a log-log plot of the percent lift vs. percent maximum flow cross-sectional area for variety of flow orifices having differing apex angles.

The area rangeability of a valve having a flow orifice with either a rectangular or arcuate base portion, as described above, varies with the include angle of the tapered slot portion. To determine the included angles which provide the most favorable area rangeability, a log—log plot of the percent of maximum lift versus the corresponding percent of maximum flow area for orifices having various included angles of tapered slot portions was prepared and is shown in FIG. 14. The plotted curves were produced by calculating, for several different apex angles, the actual flow cross-sectional area as a function of lift. The curves may then be used to calculate the area rangeabilities for the respective apex angles by determining the point along the abcissa corresponding to 10% of maximum lift. Values of area rangeability for a variety of included angles derived from FIG. 14 are set forth in Table 3. As previously noted, area rangeability is calculated by dividing 75% of maximum area by the percent area corresponding to 10 percent lift.

TABLE 3

| Apex Angle | % of Max Area at 10% Stroke | Calculated Area Rangeability |
|---|---|---|
| 90° | 1.75 | 75/1.75 = 42.9 |
| 75° | 1.6 | 75/1.6 = 46.9 |
| 60° | 1.6 | 75/1.6 = 46.9 |
| 45° | 1.7 | 75/1.7 = 44.1 |
| 30° | 2.03 | 75/2.03 = 36.9 |
| 15° | 3.05 | 75/3.05 = 24.6 |

The data in Table 3 clearly show that angles between 45° and 90° have area rangeabilities significantly greater than angles of 30° or less. Area rangeability reaches a maximum of about 47.5 for an apex angle at about 68°. This result is in contrast with the teachings of the prior art, particularly those of Kocanowski in U.S. Pat. No. 4,471,942, who taught that the "accurate control range (i.e., rangeability or area rangeability) is extended as (apex angle) B is decreased." See column 8 lines 63–64 of the Kocanowski patent. The difference in these conclusions may be due to the fact that the flow port of a valve according to the present invention may be opened to the full area of the circular inlet passage, thus resulting in unconstricted flow through the valve, in direct contradistinction to the valve taught by Kocanowski, which may not be opened to such an extent.

As the valve of the invention is well adapted to handle abrasive particulate materials, inlet segment 36c of flow orifice 36 is subjected to extensive wear, particularly at and adjacent the apex 36e during partially open/reduced flow operation. Hard facing material 40 helps to resist this wear and prolong the life of the valve but, more significantly, because the length L (FIG. 4) of the flow orifice inlet segment 36c is large, for example, it may have a length of about 5.1 cm (about 2 inches), a large amount of material may be worn away without affecting the effective flow throttling dimensions or performance of the valve. For example, even if the material wears away to the extend indicated by the dotted wear lines W or W' shown in FIG. 4, the remaining unworn portion U of apex 36e (and the area adjacent the apex) of flow orifice 36 serves to constrict the flow through inlet passage 16a to precisely the same extent as was done prior to any wear being sustained by flow orifice 36. Accordingly, it is seen that a large amount of plug material may be worn away and yet the effective throttling performance and shut-off ability of the valve will remain unchanged simply by moving plug member 24 further to the right for any given setting, by an amount which compensates for the amount of wear.

Before inlet segment 36c of orifice 36 shows appreciable wear, the shut-off position of FIG. 7C may be attained when the right hand end 24r (as viewed in FIG. 7) of plug member 24 is at position $C_n$ (FIG. 1). When inlet segment 36c has sustained wear to the extent shown by wear line W' in FIG. 4, right hand end 24r of plug member 24 will have to be positioned at position $C_w$ (FIG. 1) in order to fully close the valve. The fully-open position of end 24r of plug member 24 is shown at position O in FIG. 1. Any wear sustained by base end 36a of inlet segment 36c of orifice 36 (such wear will be minimal due to the fact that base end 36a is congruent with passageway 16) should not adversely affect the performance of the valve.

Obviously, numerous variations within the scope of the invention may be made to the specific design of the preferred embodiment illustrated in the Figures. For example, in addition to the embodiment illustrated in FIG. 8C, the inlet segment of the flow orifice may be flared as illustrated in FIG. 8D. In this embodiment, outlet segment 36d of the flow orifice is similar to that of the embodiment of FIGS. 3–6, but inlet segment 36a' has a taper converging in the direction of flow therethrough. Fluidizing the particulate solids in the expanded cross section of outlet segment 36d (FIGS. 4 and 7) helps to insure smooth passage through the valve and to avoid clogging of the material. Further, the fluidizing gas insures that the bottom of plug member 24, on both sides of outlet segment 36d, will always be moving against a fluidized bed (mass) of solids when the position of plug member 24 is changed, rather than against a packed mass of solids thereby preventing or at least reducing the likelihood of the outlet side of the valve jamming with solids. This is attained by flowing a fluidizing gas through fluidizing gas inlet passages 42a–c and 44a–c across outlet segment 36d of flow orifice 36. In the embodiment illustrated, the fluidizing gas may then pass with purge gas through outlet passageway 16b with the solids. In the embodiment illustrated in the Figures, the fluidizing gas in provided by a portion of the purge gas which is introduced via purge gas inlets 14 and 18. The fluidizing gas portion of the purge gas passes through fluidizing gas inlet passageways 42a–c and 44a–c.

The total length (L plus $1_d$) of flow orifice 36, i.e., the diameter of plug member 24 in the illustrated embodiment, is greater than the diameter of either inlet passageway 16a or outlet passageway 16b. The length L of inlet segment 36c of plug member 24 is of substantial thickness and is preferably at least one-fifth, more preferably at least one-third, of the diameter of inlet passage 16a which, in the embodiment illustrated, is the same as that of outlet passage 16b. In any event, the length L is desirably sufficiently large, for example, about 1.3 to about 5 cm (about 0.5 to about 2 inches or more) to permit a substantial amount of wear of the flow orifice without affecting the effective throttling and shut-off capabilities provided by inlet segment 36c of flow orifice 36.

As used herein, and in the claims, "registration" or "register" of the flow orifice with respect to the flow passageway simply means alignment of the flow orifice with respect to the flow passageway. When the flow orifice is stated to be "out of registration" or "not registered" with the flow passageway, it simply means that the flow passageway is entirely closed or blocked by the plug member (as illustrated in FIG. 7C). When the flow orifice is stated to be "registered" or "in registration" with the flow passageway, the flow passageway is either fully open (FIGS. 7A and 8A, showing the flow orifice "fully registered" with the flow passageway) or only partially open (FIGS. 7B and 8B, showing the flow orifice "partially registered" with the flow passageway). Flow orifice 36, when registered with inlet and outlet segments 16a and 16b, completes and opens flow passageway 16.

The purge gas is introduced via purge gas inlets 14 and 18 under sufficient pressure upstream of annular seal rings 30a and 30b to provide a desired seal ring pressure drop. Slide chamber 12 and plug member 24 and its annular seal rings 30a and 30b are all dimensioned and configured to force purge gas past annular seal rings 30a and 30b to flow along the annular space between plug member 24 and interior walls 13 of slide chamber 12 and out via outlet passage 16b. The purge gas tends to sweep solid particles which might otherwise become trapped in the annular space between plug member 24 and wall 13 of slide chamber 12, thereby tending to wear the valve and cause sticking of plug member 24.

In summary, the valves of the present invention are especially well suited for controlling the flow of fine particulate solids, whether dry or as slurries of such solids in liquid vehicles. The valves of the present invention provide significant advantages, including enhanced rangeability. In certain embodiments the valves of the present invention provide the ability to sustain extensive wear without affecting the flow controlling and shut-off abilities, rangeability or flow characteristic. The expanded cross section outlet segment of the flow orifice of certain embodiments provides an outlet flow area which is equal to or greater than the cross-sectional flow areas of both the inlet passageway (16a in the illustrated embodiments) and the inlet segment (36c in the illustrated embodiments) of the flow orifice at all flow settings, thereby helping to avoid clogging of solids. Further, both full shut-off and all the pressure drop for control of solids flow always take place at the inlet side of the plug member, so that the valve acts as a single-seated valve, not as a double-seated valve in which solids could pack between the dual seats. Further, the flow orifice of the plug member is designed so that, as illustrated in FIGS. 7A and 8A, upon full opening of the valve, the flow passageway is not reduced by the plug member whereby the valve has full line size opening capability.

As mentioned above, the length of the flow orifice (illustrated by the sum of the dimensions L and $l_d$ in FIG. 4), which generally equals the diameter of the plug member, is greater than the diameter of the flow passageway (illustrated by the dimension D in FIG. 1). In preferred embodiments of the invention well adapted for the control of particulate solids flow, e.g., the flow of fluidized solid catalyst particles for fluid catalytic cracking of petroleum feedstocks, the length of the flow orifice $(L+l_d)$ is at least about 2 inches (5.1 cm) greater than the inside diameter (D) of the flow passageway.

Typically, for a nominal 1.5 inch (3.8 cm) valve, D=1.100 inches (2.79 cm) and $(L+l_d)$=3.162 inches (8.03 cm). For a nominal 3 inch (7.62 cm) valve, D=2.300 inches (5.84 cm) and $(L+l_d)$=4.362 inches (11.08 cm), and for a nominal 6 inch (15.24 cm) valve, D=5.761 inches (14.63 cm) and $(L+l_d)$=7.823 inches (19.87 cm).

The valve or parts thereof may of course be thermally insulated and/or lined or otherwise comprised of a wear- and/or heat-resistant material. For example, external insulation about the valve body may be used to facilitate the plug member and the valve body attaining the same temperature in high temperature service so as to minimize differential thermal expansion.

The valve may be made of any suitable metal of construction, including stainless steel, and may include ceramic or other coatings and components. For example, stainless steel does not have good erosion resistance at high temperatures. Therefore, in one embodiment, a stainless steel valve may be configured so that the inlet and outlet passages of the steel valve body and the flow orifice of the steel plug member are made oversized relative to the rest of the valve and then lined with an appropriate thickness of an erosion-resistant material.

Figure 9:
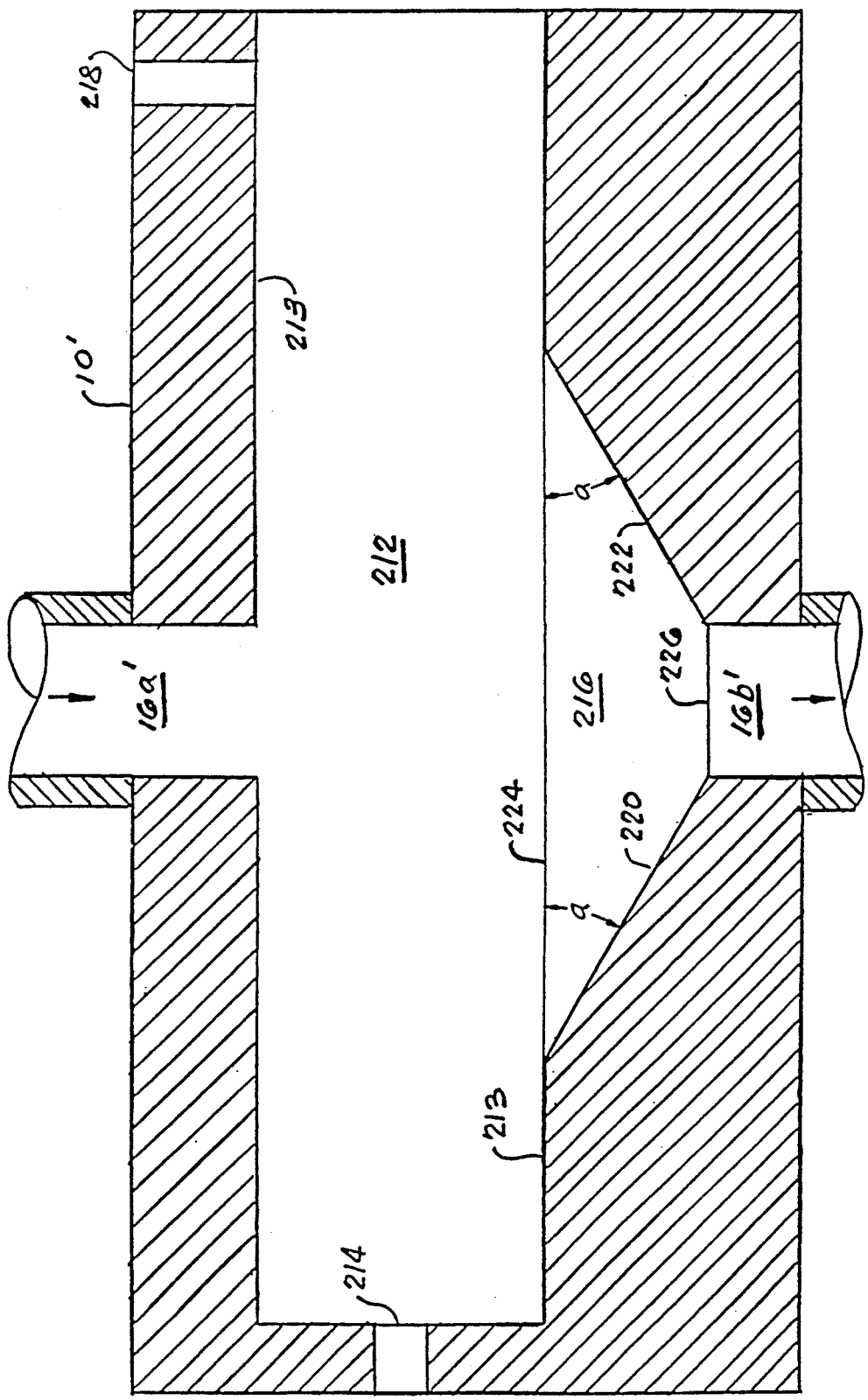
FIG. 9 is a side elevational view of the valve body of an embodiment of the invention having an outlet passage with an enlarged entry end.

Referring now to FIG. 9, there is shown a valve body 10' comprising an embodiment of the invention in which outlet passage 16b' has an enlarged cross-sectional entry end 216 which is generally wedge-shaped. Entry end 216 is defined by a pair of opposing sloping sidewalls 220, 222, wide longitudinal opening 224 into the slide chamber 212 and a narrow throat 226. Throat 226 leads into the remainder of outlet passage 16b'. Sidewalls 220, 222 define an angle a with longitudinal wall 213 of slide chamber 212. Angle a may vary and may be as large as 60°, say, about 1° to 60°, preferably about 25° to 35°, e.g., 30°, in order to provide a generally V-shaped, funnel-like opening from slide chamber 212 to outlet passage 16b'. A plug member (not shown in FIG. 10) similar to that illustrated in FIGS. 3 and 4 or FIGS. 8A and 8B may be mounted within valve body 10' as described above with respect to other embodiments of the invention. Because of the enlarged configuration of entry end 216, the plug member (not shown) utilized in the FIG. 9 embodiment is relatively longer than those of the other illustrated embodiments so as to enable the plug member to fully bridge enlarged entry end 216 at all operating positions of the valve. Valve body 10' of FIG. 9 is also relatively longer so as to accommodate the longer plug member. The enlarged entry end 216 facilitates the handling of coarser, non-fluidizable or non-fluidized solids. With the valve mounted with the longitudinal axis of slide chamber 212 positioned horizontally, coarse particles will tend to flow by gravity through enlarged entry end 216. For most coarse, non-fluidizable solids, an angle a of about 30°, say 25° to 35°, will be satisfactory. Any suitable design plug member may be used with a valve body having an enlarged entry end of the outlet passage as illustrated in FIG. 10. Although well adapted for handling coarse size particles, e.g., one quarter to one inch diameter particles or larger, the enlarged entry end embodiment is also well suited to handle fine solid particles, whether fluidized or not. Other than the increased thickness of the bottom (as viewed in FIG. 9) of valve body 10', valve body 10' is generally similar to that of valve body 10 of FIG. 1, having an inlet passage 16a' and purge gas inlets 214, 218, with one end of chamber 212 having an end wall 215. Description of other details of valve body 10' are omitted as they are generally similar to those of valve body 10.

Figure 10A:
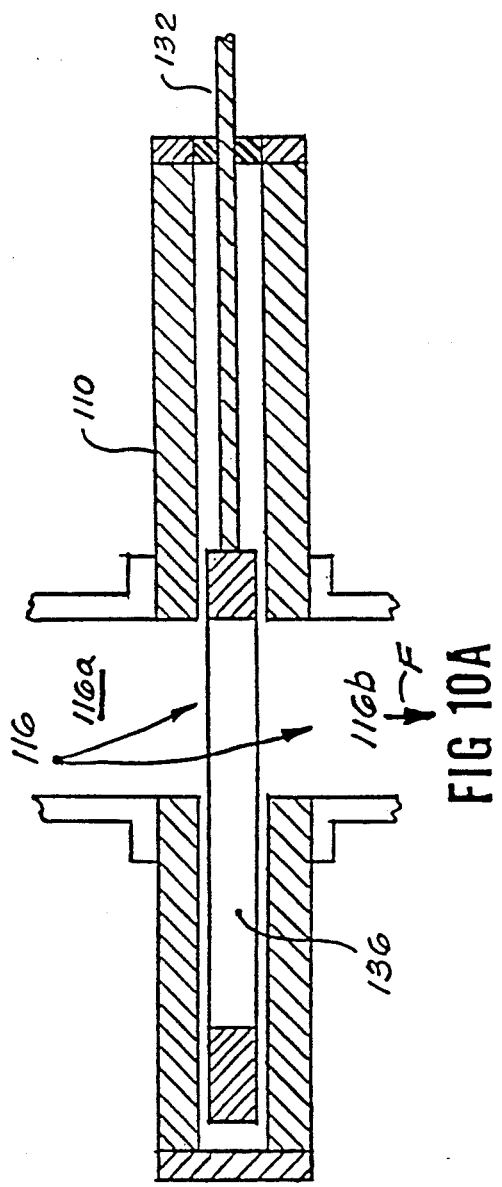
FIG. 10A is a cross-sectional schematic view in elevation of another embodiment of the invention utilizing a plate-like plug member.
Figure 10C:
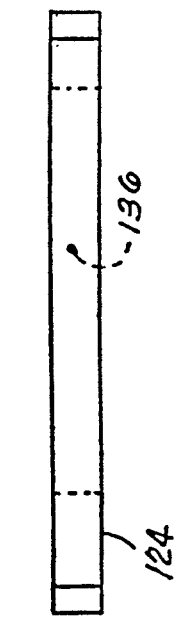
FIG. 10C is a side elevational view of the plug member of FIG. 10B.
Figure 10B:
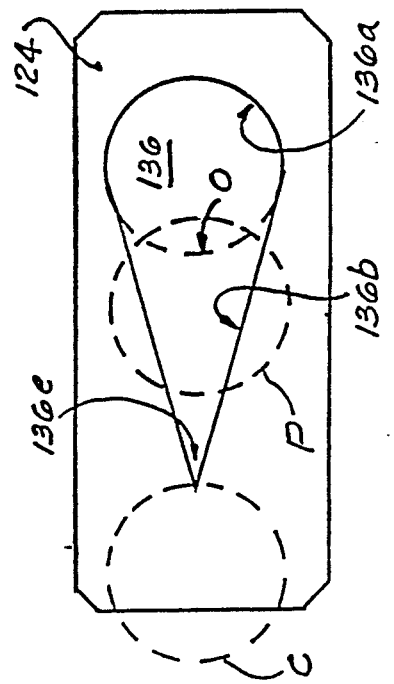
FIG. 10B is a plan view of the plate-like plug member of the FIG. 10A embodiment showing an ovoidal flow orifice.

Referring now to FIGS. 10A, 10B, and 10C, there is shown another embodiment of the present invention which is similar to that of the FIGS. 1-7 embodiment, except that the plug member 124 is of flat, plate-like construction. Plug member 124 has a flow orifice 136 which is of ovoid construction, extends through the major surfaces of plug member 124 and has a uniform cross-sectional configuration. The valve body 110 has an inlet passageway 116a and an outlet passageway 116b which cooperate to partially define a flow passage when flow orifice 136 is registered therewith to open the valve to flow therethrough in the direction indicated by the arrow F in FIG. 10A.

Plug member 124 is mounted for movement within a slide chamber (unnumbered) formed within valve body 110 and has positioning means comprising a shaft 132 attached thereto to selectively adjust the position of plug member 124 within valve body 110.

As best seen in FIG. 10B, orifice 136 (which is not drawn to scale) comprises a circular-arc base portion 136a and a tapered slot portion 136b which terminate in an apex 136e. As with inlet segment 36 of the FIGS. 1-7 embodiment, the angle subtended by apex 136e of tapered slot portion 136b is from about 45 degrees and may be from 55 to 65 degrees, preferably about 60 degrees, and the legs defining tapered slot portion 136b are of equal length and tangential to dotted line imaginary circle O. Preferably, the periphery of base portion 136a is correspondingly coincident with about 240 degrees of circle O. Inlet passageway 116a is of circular cross section and has a diameter (inside diameter) substantially equal to that of circle O. Inlet and outlet passageways 116a and 116b are coaxially aligned and both are of equal, circular cross section.

The dotted line circles O, P, and C in FIG. 10B show the relative positions of inlet flow passageway 116a, outlet flow passageway 116b and flow orifice 136. In the illustrated embodiment, inlet flow passageway 116a is identically configured to outlet flow passageway 116b but the latter can, of course, be larger.

When plug member 124 is positioned to fully align inlet flow passageway 116a with flow orifice 136 as illustrated by dotted line circle O, the valve is fully open and provides the capability of full line opening flow therethrough. When plug member 124 is positioned so that the relative position of inlet flow passageway 116a to flow orifice 136 is shown by dotted line circle P, the valve is partially open. Similarly, with plug member 124 positioned so that the relative position of inlet flow passageway 116a to flow orifice 136 is shown by dotted line circle C, the valve is fully closed. As described above with respect to the embodiment of FIGS. 1-7, plug member 124 may be moved in extremely small increments and retained at a selected location to provide any desired intermediate setting from and including full open, partially open, and full closed. At any and all such settings, by appropriately sizing flow passage 116 and sizing flow orifice 136 as described above in accordance with the description of FIG. 3A, a valve of enhanced rangeability and exhibiting the logarithmic flow characteristic described above is obtained. Details of construction of the valve of FIGS. 10A-10C, such as a stop to limit leftward (as viewed in FIG. 10A) movement, etc., are omitted as such may generally be similar to those described in detail with respect to the FIGS. 1-7 embodiment.

While the invention has been described with respect to specific preferred embodiments thereof, it will be appreciated that upon a reading and an understanding of the foregoing, variations thereto may well occur to those skilled in the art and it is intended to include all variations within the scope of the following claims.

What is claimed is:

1. A control valve comprising (a) a valve body having a slide chamber therein and an inlet passage and an outlet passage cooperating to partially define a flow passageway transversely intersecting the slide chamber; (b) a plug member mounted for movement within the slide chamber and having a flow orifice extending transversely therethrough, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith; and (c) positioning means operatively connected to the plug member to position the plug member at selected locations within the slide chamber to selectively adjust registration of the flow orifice with the inlet and outlet passages, at fully open, fully closed and a plurality of intermediate throttling positions, the flow orifice and flow passageway being respectively dimensioned and configured to provide for flow which is unconstricted by the flow orifice at the fully open position and further to provide a flow characteristic such that a plot of percentage lift on the ordinate versus percentage flow as the abscissa on log—log coordinates defines a substantially straight line of positive slope.

2. The valve of claim 1 having a rangeability of from about 50 to about 67.

3. The valve of claim 1 having an area rangeability of from about 43 to about 47.5.

4. A control valve comprising (a) a valve body having a slide chamber therein and an inlet passage and an outlet passage cooperating to partially define a flow passageway transversely intersecting the slide chamber; (b) a plug member mounted for movement within the slide chamber and having an elongated flow orifice extending transversely therethrough, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith; and (c) positioning means operatively connected to the plug member to position the plug member at selected locations within the slide chamber to selectively adjust registration of the flow orifice with the inlet and outlet passages, the flow orifice and flow passageway being respectively dimensioned and configured to provide a flow characteristic such that a plot of percentage lift on the ordinate versus percentage flow as the abscissa on log—log coordinates defines a straight line of positive slope, and wherein the inlet and outlet passages are of circular cross section and at least a segment of the flow orifice has a tapered slot portion with a cross-sectional flow area less than that of the flow passageway, the tapered slot portion being narrower than the diameter of the flow passageway over at least a majority of its length, and a base portion with a cross-sectional flow area which is at least as wide as the cross-sectional flow area of the flow passageway and which is dimensioned and configured so that when the base portion is fully registered with the flow passageway, the valve is fully open to flow therethrough and when the tapered slot portion or part thereof os registered with the flow passageway, the valve is partially open for flow therethrough.

5. The valve of claim 4 wherein the flow orifice is of ovoid cross section and at least a segment of the flow orifice has a base portion with a cross-sectional flow area which defines an arc of a circle of a diameter at least as great as the diameter of flow passageway.

6. The valve of claim 5 wherein the tapered slot portion has in flow cross section the shape of the legs of an isosceles triangle and the base portion has the shape of an arc of a circle subtending from about 225 to about 270 degrees, the legs of the triangle defining at their apex ends an angle of from about 45 to 90 degrees and respectively extending one to each opposite end of the circular arc.

7. The valve of claim 6 wherein the circular arc of the base portion subtends from about 235 to about 245 degrees and the legs of the triangle define at their apex ends an angle of from about 55 to 65 degrees and respectively extend one to each opposite end of the circular arc.

8. The valve of claim 7 wherein the angle defined at the apex of the triangle is about 60 degrees and the arc subtends about 240 degrees.

9. The valve of claim 4 wherein the tapered slot portion has in flow cross section the shape of the legs of an isosceles triangle, the legs defining at their ends an angle of from about 45 to 90 degrees, and the base portion has the shape of an open-sided rectangle, the imaginary base of the isosceles triangle coinciding with the open side of the rectangle.

10. The valve of claim 9 wherein the legs of the triangle define at their apex ends an angle of from about 55 to 65 degrees.

11. The valve of claim 10 wherein the legs of the triangle define at their apex ends an angle of about 60 degrees.

12. The valve of claim 9 wherein the rectangle has a width approximately equal to the diameter of the inlet passage.

13. The valve of claim 7 having a rangeability of about 58.

14. The valve of claim 3 or claim 4 having an area rangeability of about 46.9.

15. The valve of claim 4, claim 6 or claim 9 wherein the flow orifice is of constant cross-sectional shape.

16. The valve of claim 4 wherein the inlet and outlet passages are respectively located at radically opposite sides of the slide chamber.

17. The valve of claim 4 wherein the flow orifice comprises an inlet segment facing the inlet passage of the flow passageway, and an outlet segment facing the outlet passage of the flow passageway and the cross-sectional area of the outlet segment is equal to or greater than the maximum cross-sectional area of the inlet segment.

18. The valve of claim 17 wherein the inlet passage and outlet passage are coaxial.

19. The valve of claim 5 wherein the flow orifice has an ovoid cross section, the base portion being dimensioned and configured to be congruent with an arc of the cross section of the inlet passage.

20. The valve of claim 4 wherein the slide chamber comprises a generally cylindrical bore and the plug member is of generally cylindrical configuration.

21. A control valve comprising:
a valve body having therein a slide chamber and an inlet passage and an outlet passage at respective opposite sides of the chamber, the inlet and outlet passages cooperating to partially define a flow passageway transversely intersecting the slide chamber;
a plug member mounted for movement within the slide chamber and having a flow orifice extending transversely therethrough, the plug member and its flow orifice being each dimensioned and configured to seal the flow passageway when the flow orifice is out of registration with the flow passageway and to complete the flow passageway by connecting the inlet and outlet passage in flow communication when the flow orifice is registered therewith, at least a segment of the flow orifice being dimensioned and configured to have tapered slot portion with a cross-sectional flow area less than that of the flow passageway, the tapered slot portion (a) having in flow cross section the shape of an isosceles triangle, the legs of which subtend at their apex ends an angle of from about 45 to 90 degrees, and (b) being narrower than the diameter of the flow passageway over at least a majority of its length; and a base portion with a cross-sectional flow area at least as wide as the cross-sectional flow area of the flow passageway, and dimensioned and configured so that when the base portion is fully registered with the flow passageway, the valve is fully open to flow therethrough and when the tapered slot portion or part thereof is registered with the flow passageway, the valve is partially open for flow therethrough ; and
positioning means operatively connected to the plug member to position the plug member at selected incremental locations within the slide chamber to selectively adjust registration of the flow orifice with the inlet and outlet passages at fully open, fully closed and a plurality of intermediate throttling positions.

22. The valve of claim 21 wherein the base portion has a circular arc cross-sectional flow area which defines from about 225 to about 270 degrees of an arc of a circle of a diameter at least as great as the effective diameter of the flow passageway, and the legs of the isosceles triangle in the tapered slot portion define at their apex ends an angle of from about 45 to 90 degrees and extend one to each respective end of the arc.

23. The valve of claim 22 wherein the base portion has a circular arc cross-sectional flow area which defines from about 235 to about 245 degrees of an arc of a circle of a diameter at least as great as the effective diameter of the flow passageway, and the legs of the isosceles triangle in the tapered slot portion define at their apex ends an angle of from about 55 to 65 degrees and extend one to each respective end of the arc.

24. The valve of claim 4 or claim 21 wherein at least the inlet segment of the flow orifice is configured to have a base portion with a cross-sectional flow area which defines an arc of a circle of a diameter at least as great as the effective diameter of the flow passageway and wherein at least the inlet passage is of circular cross section and of an effective diameter substantially the same as the diameter of the circular arc of the base portion of the flow orifice.

25. The valve of claim 21 wherein at least the inlet segment of the flow orifice is configured to have a base portion with a cross-sectional flow area which defines three sides of a rectangle having a width at least as great as the effective diameter of the flow passageway.

26. The valve of any one of claims 6, 9, 22 or 25 wherein the legs of the triangle define at their apex ends an angle of from about 60 to 75 degrees.

27. The valve of claim 21 wherein the flow orifice is of constant cross-sectional shape.

28. The valve of claim 27 wherein the outlet passage is also of circular cross section and of substantially the same effective diameter as the circular arc of the base portion of the flow orifice.

29. The valve of claim 4 or claim 21 wherein the flow orifice comprises an inlet segment facing the inlet passage and an outlet segment facing the outlet passage, and the cross-sectional area of the outlet segment of the flow orifice is sufficiently greater than the cross-sectional area of the entry to the outlet passage whereby, at all operating positions of the plug member within the slide chamber, the outlet passage is unconstricted by the plug member.

30. The valve of claim 21 wherein the angle defined at the apex of the triangle is about 60 degrees.

31. The valve of claim 6 or claim 23 wherein the legs of the tapered slot portion are, at their ends opposite the apex ends, substantially tangential to the arc at the respective opposite ends of the arc.

32. The valve of claim 4 or claim 21 wherein the tapered slot portion has in flow cross section the shape of the legs of an isosceles triangle, the legs defining at their ends an angle of from about 45 to 90 degrees, and the base portion has the shape of an open-sided polygon, the imaginary base of the isosceles triangle coinciding with the open side of the polygon.

* * * * *